United States Patent
Suzuki et al.

(10) Patent No.: US 11,186,283 B2
(45) Date of Patent: Nov. 30, 2021

(54) CONTROL APPARATUS FOR ELECTRIC VEHICLE, CONTROL SYSTEM FOR ELECTRIC VEHICLE, AND CONTROL METHOD FOR ELECTRIC VEHICLE

(71) Applicant: Hitachi Automotive Systems, Ltd., Hitachinaka (JP)

(72) Inventors: Keisuke Suzuki, Kawasaki (JP); Hitoshi Kobayashi, Machida (JP); Kazuya Takahashi, Sagamihara (JP)

(73) Assignee: Hitachi Astemo, Ltd., Hitachinaka (JP)

(*) Notice: Subject to any disclaimer, the term of this patent is extended or adjusted under 35 U.S.C. 154(b) by 145 days.

(21) Appl. No.: 16/466,583

(22) PCT Filed: Nov. 28, 2017

(86) PCT No.: PCT/JP2017/042478
§ 371 (c)(1),
(2) Date: Jun. 4, 2019

(87) PCT Pub. No.: WO2018/105435
PCT Pub. Date: Jun. 14, 2018

(65) Prior Publication Data
US 2020/0070836 A1 Mar. 5, 2020

(30) Foreign Application Priority Data
Dec. 5, 2016 (JP) .............................. JP2016-236037

(51) Int. Cl.
*B60W 30/18* (2012.01)
*B60L 15/20* (2006.01)
(Continued)

(52) U.S. Cl.
CPC ..... *B60W 30/18172* (2013.01); *B60L 15/2009* (2013.01); *B60W 10/08* (2013.01);
(Continued)

(58) Field of Classification Search
CPC ........... B60W 30/18172; B60W 10/08; B60W 40/064; B60W 2520/253; B60W 2520/30;
(Continued)

(56) References Cited

U.S. PATENT DOCUMENTS 6,549,840 B1 4/2003 Mikami et al.
9,469,199 B1 10/2016 Gauthier
(Continued)

FOREIGN PATENT DOCUMENTS

JP 9-240301 A 9/1997
JP 2001-171378 A 6/2001
(Continued)

OTHER PUBLICATIONS

International Search Report (PCT/ISA/210) issued in PCT Application No. PCT/JP2017/042478 dated Feb. 27, 2018 with English translation (four (4) pages).
(Continued)

*Primary Examiner* — Marthe Y Marc-Coleman
(74) *Attorney, Agent, or Firm* — Crowell & Moring LLP

(57) ABSTRACT

Provided is control apparatus for an electric vehicle, which is capable of suppressing simultaneous slip of front and rear wheels. The control apparatus for an electric vehicle controls a front electric motor and a rear electric motor so that a difference between a torque command value of the front electric motor and a torque command value of the rear electric motor is larger than a predetermined value.

12 Claims, 11 Drawing Sheets

(51) Int. Cl.
 *B60W 10/08* (2006.01)
 *B60W 40/064* (2012.01)

(52) U.S. Cl.
 CPC ..... *B60W 40/064* (2013.01); *B60W 2520/263* (2013.01); *B60W 2520/30* (2013.01); *B60W 2710/085* (2013.01)

(58) Field of Classification Search
 CPC ....... B60W 2710/085; B60W 2710/40; B60W 2710/403; B60L 15/2009; B60L 9/18; B60L 15/20; Y02T 10/72
 See application file for complete search history.

(56) References Cited

U.S. PATENT DOCUMENTS

2006/0196714 A1  9/2006  Sugimoto et al.
2008/0289894 A1  11/2008  Muta et al.
2013/0173100 A1* 7/2013  Takagi .................... B60L 50/51
                                                         701/22
2016/0129911 A1  5/2016  Takahashi

FOREIGN PATENT DOCUMENTS

| JP | 2005-184944 A | 7/2005 |
| JP | 2006-248319 A | 9/2006 |
| JP | 2007-210418 A | 8/2007 |
| JP | 2016-93033 A  | 5/2016 |

OTHER PUBLICATIONS

Japanese-language Written Opinion (PCT/ISA/237) issued in PCT Application No. PCT/JP2017/042478 dated Feb. 27, 2018 with English translation (10 pages).
Extended European Search Report issued in counterpart European Application No. 17878414.6 dated Oct. 16, 2019 (11 pages).
European Office Action issued in European Application No. 17 878 414.6 dated Jun. 23, 2021 (seven (7) pages).

\* cited by examiner

CONTROL APPARATUS FOR ELECTRIC VEHICLE, CONTROL SYSTEM FOR ELECTRIC VEHICLE, AND CONTROL METHOD FOR ELECTRIC VEHICLE

TECHNICAL FIELD

The invention relates to control apparatus, control systems, and control methods for electric vehicles.

BACKGROUND ART

Patent Literature 1 discusses conventional control apparatus for electric vehicles, which is installed in a four-wheel-drive vehicle whose front wheels are driven by an engine, and whose rear wheels are driven by an electric motor. Such control apparatus is conventionally configured to suppress a wheel slip on a slope by increasing a motor torque for starting the vehicle as the angle of inclination increases, namely the pitch of the slope increases, to adjust torque distribution between the front and rear wheels.

CITATION LIST

Patent Literature

PTL 1: Japanese Unexamined Patent Application Publication (Kokai) No. 2005-184944

SUMMARY OF INVENTION

Technical Problem

Nevertheless, if the driver's operation is excessive with respect to a road surface, there is a chance that the front and rear wheels slip at the same time even if torque is distributed to the front and rear wheels as described in the Patent Literature 1.

An object of the invention is to provide control apparatus for an electric vehicle, which is capable of suppressing simultaneous slip of front and rear wheels.

Solution to Problem

According to one embodiment of the invention, a control apparatus for an electric vehicle controls a front electric motor and a rear electric motor so that a difference between a torque command value of the front electric motor and a torque command value of the rear electric motor is larger than a predetermined value.

The control apparatus thus suppresses a simultaneous drive slip or brake slip of the front and rear wheels.

DESCRIPTION OF EMBODIMENTS

Embodiment 1

Figure 1:
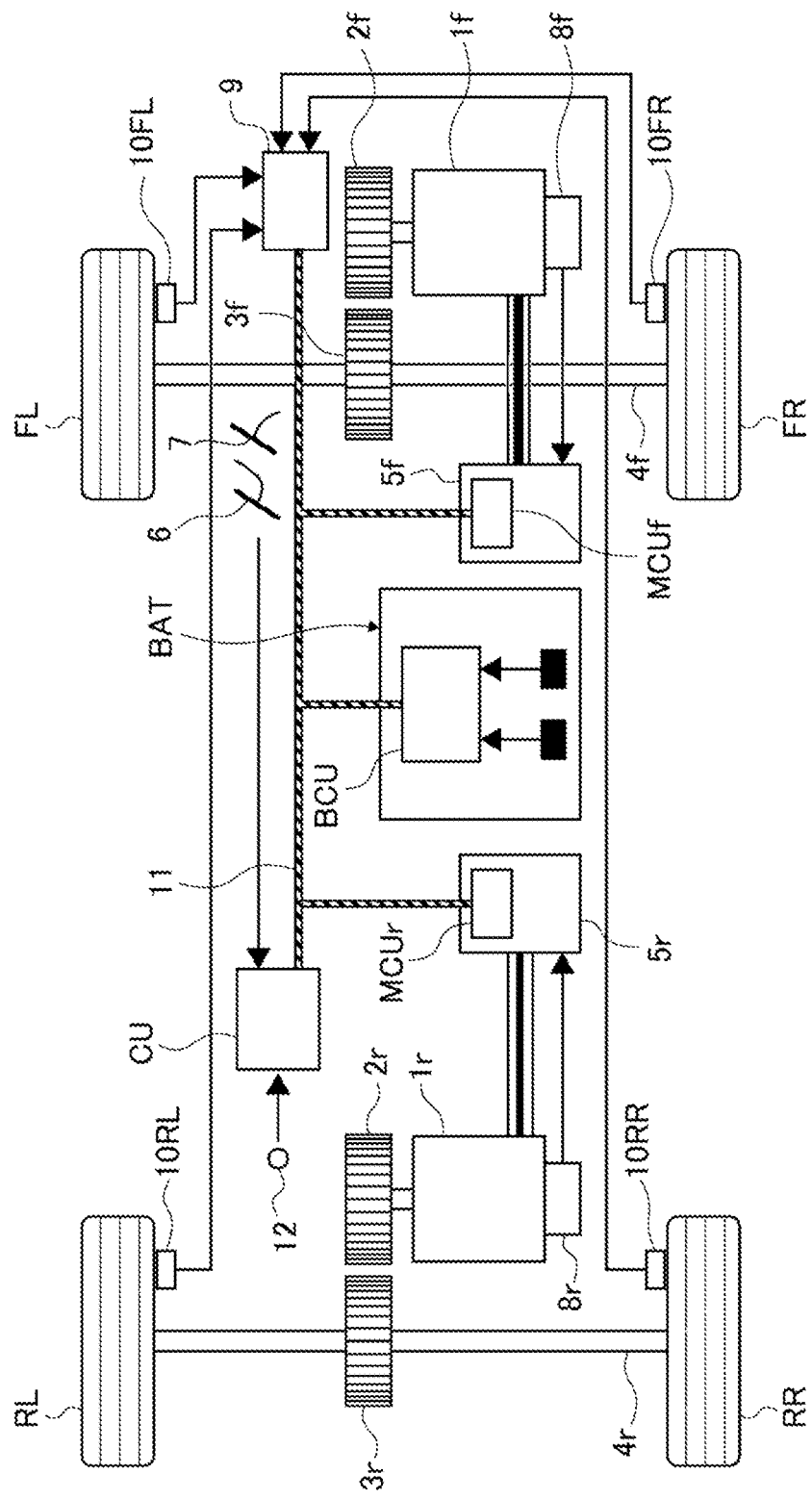
FIG. 1 is a system diagram of an electric vehicle according to an Embodiment 1.

FIG. 1 is a system diagram of an electric vehicle according to an Embodiment 1. The electric vehicle according to the Embodiment 1 is a four-wheel-drive vehicle including front wheels FL and FR driven by a front motor 1*f* and rear wheels RL and RR driven by a rear motor 1*r*. The front motor 1*f* is connected with a differential gear 3*f* via a deceleration mechanism 2*f*. The differential gear 3*f* is connected with a drive shaft 4*f*. The drive shaft 4*f* is connected with the front wheels FL and FR. An inverter 5*f* includes a motor control unit MCUf which controls the front motor 1*f*. In a similar fashion, the rear motor 1*r* is connected with a differential gear 3*r* via a deceleration mechanism 2*r*. The differential gear 3*r* is connected with a drive shaft 4*r*. The drive shaft 4*r* is connected with the rear wheels RL and RR. An inverter 5*r* includes a motor control unit MCUr which controls the rear motor 1*r*.

A high-voltage battery BAT includes a battery control unit BCU which controls electric power to be supplied. The high-voltage battery BAT is a battery module connected with a plurality of batteries. The battery control unit BCU controls the electric power to be supplied from a single battery module to a plurality of motors (front and rear motors 1*f* and 1*r*).

The electric vehicle includes a stroke sensor 6 configured to output a brake pedal stroke signal, an accelerator position sensor 7 configured to output an accelerator position signal, resolvers 8*f* and 8*r* each configured to output a motor rotation speed signal including a rotating direction of the corresponding electric motor 1, and a longitudinal acceleration sensor 12 configured to detect a longitudinal acceleration sg of the vehicle. A vehicle control unit CU receives a range position signal from a shift lever, the brake pedal stroke signal from the stroke sensor 6, and the accelerator position signal from the accelerator position sensor 7. The vehicle control unit CU further receives the motor rotation speed signals from the resolvers 8*f* and 8*r* through the motor control units MCUf and MCUr. The vehicle control unit CU calculates drive torque command values of the electric motors 1 on the basis of the accelerator position and the like and then drives the front motor 1*f* and the rear motor 1*r* according to the drive torque command values.

A brake controller 9 is connected to wheel speed sensors 10FL, 10FR, 10RL and 10RR (hereinafter, also simply referred to as 10) provided to the wheels. The brake controller 9 receives a rotation speed signal of each wheel. The wheel speed sensors 10 detect wheel speeds from an electromagnetic pulse cycle. The brake controller 9 adjusts brake fluid to be supplied to a brake unit by fluid pressure of each wheel, on the basis of a driver's brake operation amount that is detected by the stroke sensor 6. The brake controller 9 thus controls a brake torque of each wheel. Information-transferring communication between the motor control units MCUf and MCUr, the vehicle control unit CU, and the brake controller 9 is carried out through a CAN communication line 11.

Figure 2:
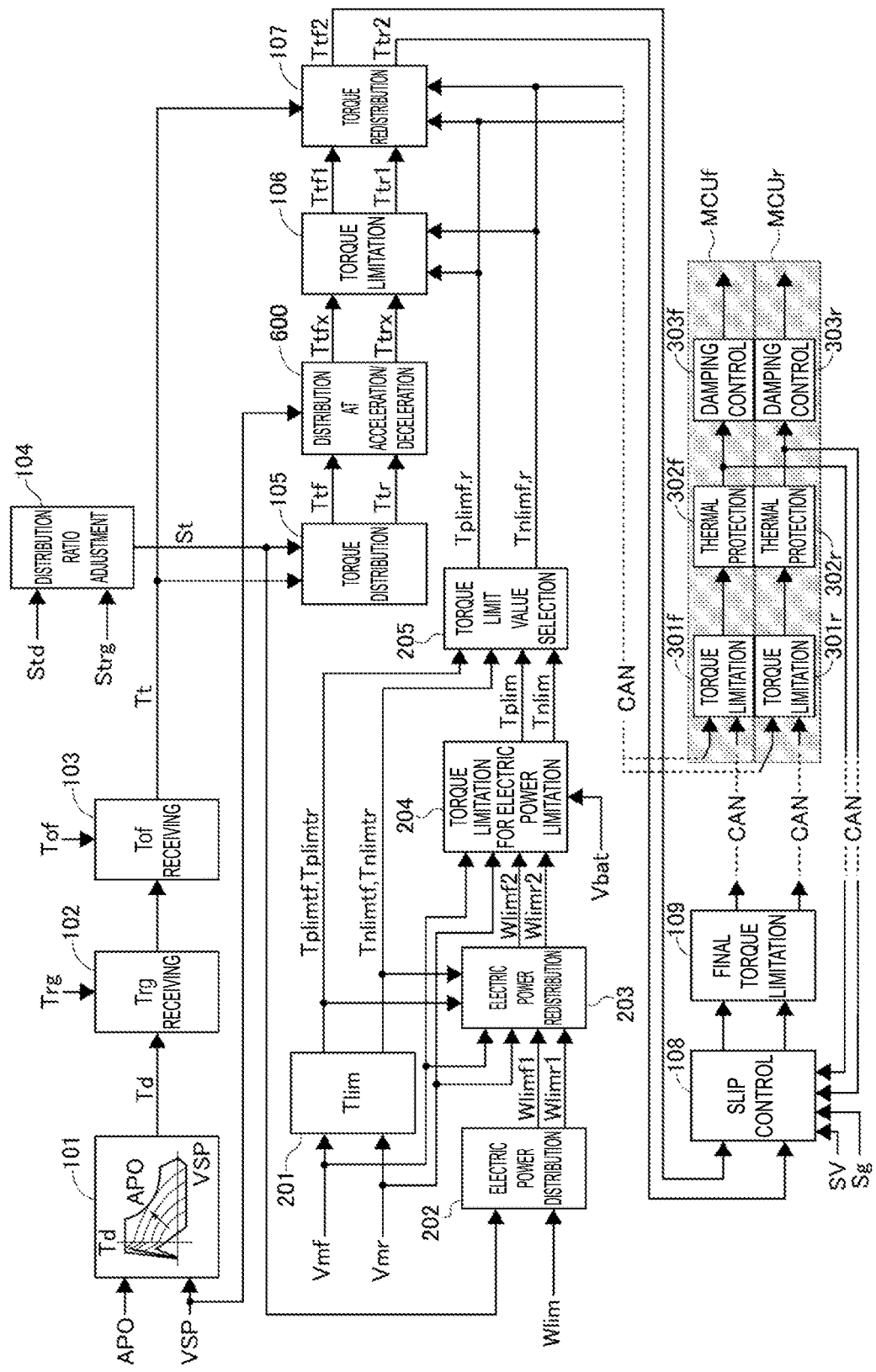
FIG. 2 is a control block diagram of the electric vehicle according to the Embodiment 1.

FIG. 2 is a control block diagram of the electric vehicle according to the Embodiment 1.

A driver's demand torque calculating portion 101 calculates a driver's demand torque Td on the basis of an accelerator position APO and vehicle speed VSP. The larger the accelerator position APO is, the larger the value of the driver's demand torque Td is set.

A regenerative torque receiving portion 102 receives a demand regenerative torque Trg based on a demand brake torque that is calculated by another calculation portion. The regenerative torque receiving portion 102 then corrects the driver's demand torque Td.

A demand torque receiving portion 103 receives a demand drive torque Tof calculated by another calculation portion and then corrects the driver's demand torque Td. A total axial torque command value of the front and rear motors 1*f* and 1*r*, which is obtained from command values of the driver's demand torque calculating portion 101, the regenerative torque receiving portion 102, and the demand torque receiving portion 103, is outputted as a demand torque Tt of the vehicle.

A distribution ratio adjusting portion 104 determines a distribution ratio St for distributing the demand torque Tt to the front motor 1*f* and the rear motor 1*r*, on the basis of a driving force distribution ratio command Std and a regenerative braking force distribution ratio command Strg. The driving force distribution ratio command is a command obtained by calculating a driving force distribution ratio of the front and rear wheels according to a driving condition of the vehicle in a driving force distribution ratio calculation portion, not shown, and then outputted. The regenerative braking force distribution ratio command is a command obtained by calculating a regenerative braking force distribution ratio of the front and rear wheels in a regenerative braking force distribution ratio calculation portion, not shown, and then outputted. On the basis of these distribution ratios and a current driving condition, the distribution ratio adjusting portion 104 determines the distribution ratio St. On the basis of the demand torque Tt and the distribution ratio St, a torque distribution portion 105 calculates a reference front motor torque command value Ttf and a reference rear motor torque command value Ttr. Hereinafter, the front motor 1*f* and the rear motor 1*r* will be collectively referred to as reference motor torque command values Ttfr. The reference motor torque command values Ttfr correspond to target torques when the front motor 1*f* and the rear motor 1*r* are controlled.

A distribution portion 600 at acceleration/deceleration changes the distribution ratio St when the torque is suddenly changed on the basis of the accelerator pedal position APO, brake pedal stroke BPS, the reference front motor torque command value Ttf, the reference rear motor torque command value Ttry, and longitudinal gradient SP. The distribution portion 600 also calculates a reference front motor torque command value Ttfy at acceleration/deceleration and a reference rear motor torque command value Ttry at acceleration/deceleration (hereinafter, they will be collectively referred to as reference motor torque command values Ttfry at acceleration/deceleration). The distribution portion 600 thus produces a predetermined difference between the torque command value of the front wheels and the torque command value of the rear wheels, to thereby avoid simultaneous slip of the front and rear wheels. Details will be discussed later.

A torque limiting portion 106 calculates a first front motor torque command value Ttf1 and a first rear motor torque command value Ttr1 (hereinafter, these command values will be referred to as first torque command values Tt1) limited with positive torque limit values Tplimf and Tplimr and negative torque limit values Tnlimf and Tnlimr (hereinafter, these limit values will be referred to as torque limit values Tlim) selected by a torque limit value selecting portion 205, which will be described later. In other words, the reference motor torque command values Ttfry at acceleration/deceleration are corrected to fall within the torque limit values Tlim.

If a total of the first torque command values Tt1 of the motors is lower than the demand torque Tt, a torque redistribution portion 107 calculates a second front motor torque command value Ttf2 and a second rear motor torque command value Ttr2 (hereinafter, these command values will be referred to as second torque command values Tt2), which are obtained by redistributing the torque to the motor in which the first torque command value Tt1 is lower than the torque limit value Tlim, without allowing the total of the first torque command values Tt1 of the motors to exceed the demand torque Tt.

A slip control portion 108 determines whether any of the wheels is slipping, on the basis of wheel speed sv, the longitudinal acceleration sg, and torque command values of thermal protection portions 302*f* and 302*r* described later. When slip, which includes a drive or brake slip, is occurring, the slip control portion 108 calculates a torque limit amount on the torque of the motor that is connected to a slipping wheel. A final torque limiting portion 109 outputs to the motors 1*f* and 1*r* a final torque command value Tt3 which is determined on the basis of the torque limit amount calculated by the slip control portion 108, with respect to the second torque values Tt2.

A maximum torque limit value calculating portion 201 calculates positive torque limit values Tplimtf and Tplimtr and negative torque limit values Tnlimtf and Tnlimtr (hereinafter, the positive torque limit values Tplimtf and Tplimtr and the negative torque limit values Tnlimtf and Tnlimtr will be referred to also as maximum torque limit values Tlimax) of the motors on the basis of a rotation speed Vmf of the front motor 1*f* and a rotation speed Vmr of the rear motor 1*r*. Torque characteristics with respect to motor rotation frequency are previously determined, and a maximum torque value which can be outputted with respect to a certain rotation speed is set on the basis of a map or the like.

A power distribution portion 202 calculates a first power limit value Wlimf1 of the front motor 1*f* and a first power limit value Wlimr1 of the rear motor 1*r* (hereinafter, the limit values Wlimf1 and Wlimr1 will be referred to also as first power limit values Wlim1) on the basis of a battery power limit value Wlim that is an upper limit value of the electric power supplied from the high-voltage battery BAT, and the distribution ratio St. That is, at the time of supply of electric power from the single high-voltage battery BAT to the plurality of motors, if the power consumed by the motors is determined separately with respect to each motor, a total consumed power might exceed the battery power limit value Wlim. One idea is to determine the consumed power separately with respect to each motor and then modify the torque of each motor without allowing the consumed power to exceed the battery power limit value Wlim. However, this requires repetitive calculation. In contrast, the Embodiment 1 previously carries out power distribution and sets the first power limit values Wlim1 of the motors on the basis of the power distribution. The Embodiment 1 thus effectively controls the torque of each motor without allowing the consumed power to exceed the battery power limit value Wlim.

A power redistribution portion 203 calculates a second power limit value Wlimf2 of the front motor 1f and a second power limit value Wlimr2 of the rear motor 1r (hereinafter, the second power limit value Wlimf2 and the second power limit value Wlimr2 will be referred to also as second power limit values Wlim2) obtained by distributing surplus power, which is obtained by deducting actual consumed power Wx(x=f, r) from the first power limit value Wlim1 of one of the motors, to the power limit values Wlim1 of the other motor.

A first torque limit value calculating portion 204 calculates a battery potential Vbat of the high-voltage battery BAT, the rotation speeds Vmf and Vmr, and a positive torque limit value Tplimw and a negative torque limit value Tnlimw (hereinafter, the positive torque limit value Tplimw and the negative torque limit value Tnlimw will be referred to also as first torque limit values Tlimw) according to the second power limit values Wlim2. The torque limit value selecting portion 205 selects a maximum torque limit value Tlimmax or the first torque limit value Tlimw, whichever limit value is lower. The torque limit value selecting portion 205 then outputs the selected limit value as the torque limit values Tlim.

The motor control units MCUf and MCUr include torque limit portions 301f and 301r, thermal protection portions 302f and 302r, and damping control portions 303f and 303r. The torque limit portions 301f and 301r calculate the motor torque command values on the basis of the final torque command value Tt3 outputted from the final torque limiting portion 109 and the torque limit values Tlim outputted from the torque limit value selecting portion 205. The thermal protection portions 302f and 302r limit the motor torque command values so that the motors have predetermined or lower temperature, on the basis of a heat generation amount that is calculated from electric current values supplied to the motors, and measured values of temperature sensors mounted on the motors. The damping control portions 303f and 303r calculate damping torques for suppressing vibrations generated in the drive shafts 4f and 4r and applies the damping torques to the motor torque command values, to thereby implement the motor torque control.

(Distribution Portion at Acceleration/Deceleration)

Figure 3:
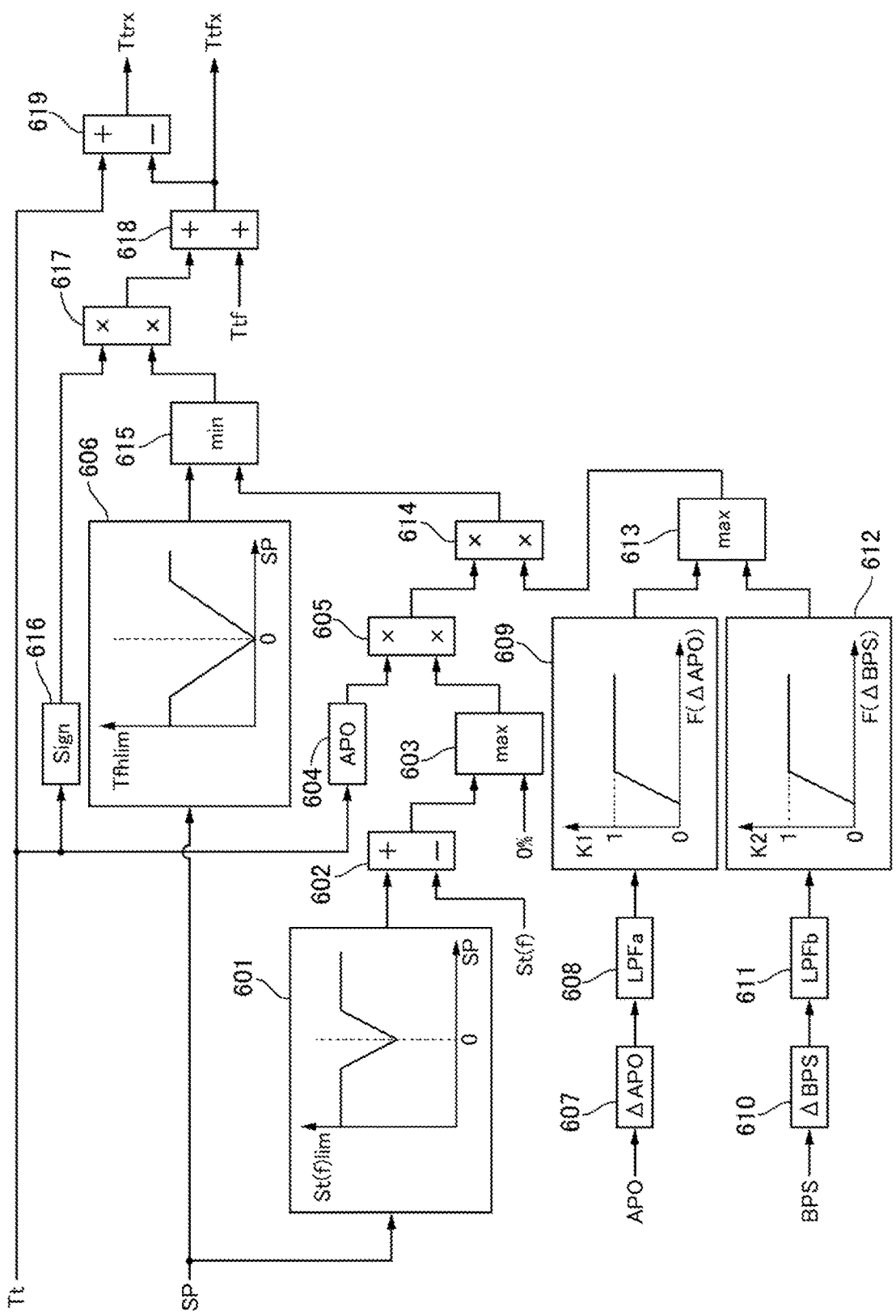
FIG. 3 is a control block diagram showing in detail a distribution portion at acceleration/deceleration according to the Embodiment 1.

FIG. 3 is a control block diagram showing in detail a distribution portion at acceleration/deceleration according to the Embodiment 1. A torque distribution ratio limiting portion 601 calculates a torque distribution ratio limit value St(f)lim on the basis of the longitudinal gradient SP. The torque distribution ratio limit value St(f)lim is a limit value of a front wheel distribution ratio St(f) distributed to the front wheels on the basis of the distribution ratio St. When the distribution ratio St of the front wheels to the rear wheels is 1 to 1, the ratio St(f) is 50%. When the distribution ratio St of the front wheels to the rear wheels is 2 to 1, the ratio St(f) is 67%. When the longitudinal gradient SP is small, the value St(f)lim is decreased. When the longitudinal gradient SP is large, the value St(f)lim is increased. In other words, the torque distributed to the front wheel side is reduced on a flat road, whereas a high torque is allowed to be distributed to the front wheel side on a pitched road. A difference calculation portion 602 deducts the ratio St(f) from the value St(f)lim to calculate an insufficient distribution ratio (%) of the torque distributed to the front wheel side. A distribution ratio selecting portion 603 outputs the insufficient distribution ratio (%) or 0%, whichever value is larger. If the value St(f)lim is larger than the ratio St(f), the distribution ratio selecting portion 603 outputs the insufficient distribution ratio (%) without change. If the value St(f)lim is smaller than the ratio St(f), the distribution ratio selecting portion 603 determines that a high torque is already distributed to the front wheels, and therefore outputs 0%. An absolute value processing portion 604 converts a demand torque Tt into an absolute value and outputs the absolute value to an insufficient torque calculation portion 605 described later. The insufficient torque calculation portion 605 multiplies a demand torque absolute value |Tt| by the insufficient distribution ratio (%) to calculate an insufficient torque to be added to the front wheel side, that is, torque which is considered insufficient on the front wheel side.

A torque correction amount limit value calculating portion 606 sets, on the basis of the longitudinal gradient SP, a correction amount upper limit value Tfhlim of a first torque correction amount, described later. When the longitudinal gradient SP is small, the p torque correction amount limit value calculating portion 606 reduces the value Tfhlim. The torque correction amount limit value calculating portion 606 increases the value Tfhlim as the longitudinal gradient increases. When the longitudinal gradient SP has a predetermined or larger value, the torque correction amount limit value calculating portion 606 sets the value Tfhlim to a constant value. In other words, the first torque correction amount is limited to a certain degree to suppress an excessive correction and avoid an unnecessary increase of a torque difference between the front and rear wheels. Details will be discussed later.

An accelerator pedal operation speed calculating portion 607 differentiates the accelerator pedal position APO or calculates an accelerator pedal operation speed Δ APO that indicates a change amount of the position APO before a subsequent control cycle. An accelerator-side low-pass filter 608 provides a low-pass filter processing to the speed Δ APO and calculates an accelerator pedal operation speed filtering value F (Δ APO). Accordingly, the speed Δ APO is prevented from being outputted as zero even in a situation where actual motor torque cannot keep up with the accelerator pedal operation. An accelerator-side correction gain calculating portion 609 calculates an accelerator-side correction gain K1 according to the value F (Δ APO). When the value F (Δ APO) is small, the correction gain K1 is set to a small value. When the value F(Δ APO) is large, the correction gain K1 is set to a large value. In other words, when the accelerator pedal operation speed Δ APO is low, the correction gain K1 is set to zero to restore the distribution ratio St to an initial value, whereas when the accelerator pedal operation speed Δ APO is high, the distribution ratio St is allowed to change.

A brake pedal operation speed calculating portion 610 differentiates the brake pedal stroke amount BPS or calculates the brake pedal operation speed Δ BSP that indicates a change amount of the stroke amount BPS before a subsequent control cycle. A brake-side low-pass filter 611 provides a low-pass filter processing to the speed Δ BPS, and calculates a brake pedal operation speed filtering value F (Δ

BPS). Accordingly, the speed Δ BPS is prevented from being outputted as zero even in a situation where the actual motor torque cannot keep up with the brake pedal operation. A brake-side correction gain calculating portion 612 calculates a brake-side correction gain K2 according to the value F(Δ BPS). When the value F(Δ BPS) is small, the correction gain K2 is set to a small value. When the value F(Δ BPS) is large, the correction gain K2 is set to a large value. In other words, when the brake pedal operation speed Δ BPS is low, the correction gain K2 is set to zero to restore the distribution ratio St to the initial value, whereas when the brake pedal operation speed Δ BPS is high, the distribution ratio St is allowed to change.

A gain selecting portion 613 selects the accelerator-side correction gain K1 or the brake-side correction gain K2, whichever gain is larger, and outputs the selected gain to a gain multiplication portion 614 described later. The gain multiplication portion 614 multiplies the insufficient torque that is calculated in the insufficient torque calculation portion 605 by the gain K1 or K2. The gain multiplication portion 614 thus calculates the insufficient torque at a torque change. When the accelerator pedal operation speed Δ APO or the brake pedal operation speed Δ BPS is low, the gains K1 and K2 are set to zero, and the insufficient torque is therefore not outputted. If the accelerator pedal operation speed Δ APO or the brake pedal operation speed Δ BPS has a predetermined or larger value, this means that there is a sudden change in torque. Therefore, an insufficient torque at a torque change, which is obtained by multiplying the insufficient torque by the gain, is outputted.

A torque correction amount selecting portion 615 outputs, as a first torque correction amount, the correction amount upper limit value Tfhlim that is calculated in the torque correction amount limit value calculating portion 606 or the insufficient torque at a torque change, which is calculated in the gain multiplication portion 614, whichever torque is lower. Accordingly, even if the driver promptly steps on the accelerator pedal, for example, on an upward slope, and a high insufficient torque at a torque change is calculated due to the correction of the distribution ratio St, a value that does not exceed the correction amount upper limit value Tfhlim is outputted.

A sign extracting portion 616 extracts a sign of the demand torque Tt and then outputs the extracted sign to a sign multiplication portion 617 described later. The sign multiplication portion 617 multiplies the first torque correction amount by the sign of the demand torque Tt to calculate a final torque correction amount. A reference front motor torque command value calculating portion 618 at acceleration/deceleration adds the torque correction amount to the reference front motor torque command value Ttf and then outputs a reference front motor torque command value Ttfx at acceleration/deceleration. A reference rear motor torque command value calculating portion 619 at acceleration/deceleration deducts the reference front motor torque command value Ttfx at acceleration/deceleration from the demand torque Tt, and then outputs the reference rear motor torque command value Ttrx at acceleration/deceleration. Consequently, the demand torque Tt is not changed even if the distribution ratio St is changed.

(Distribution Processing at Acceleration/Deceleration)
(Operation when the Vehicle Starts Moving on an Upward Slope)

Figure 4A:
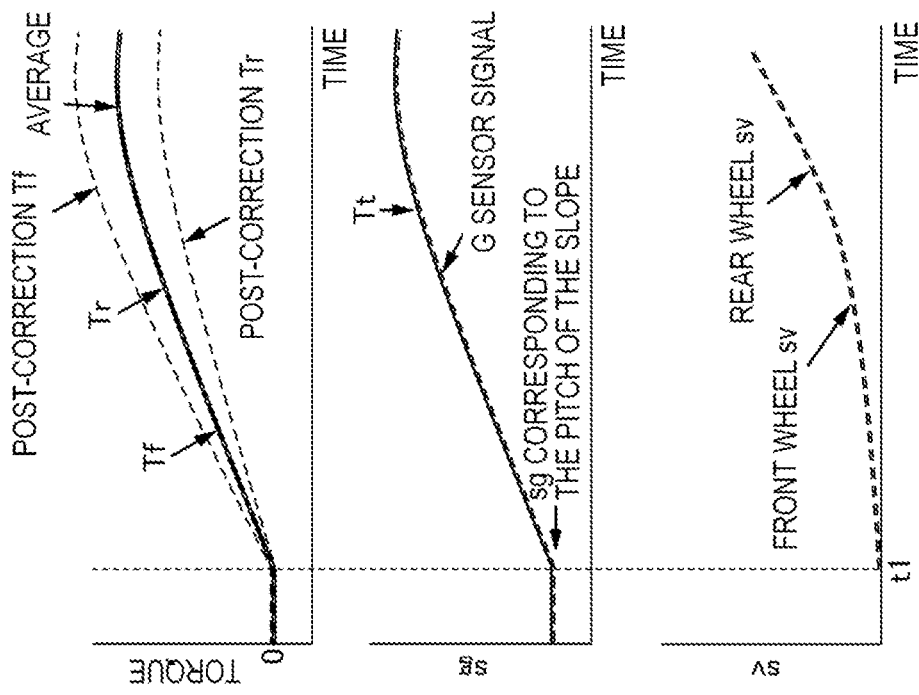
FIGS. 4A and 4B show time charts depicting situations where slip does not occur when the vehicle starts moving on an upward slope with a high road friction coefficient μ.
Figure 4B:
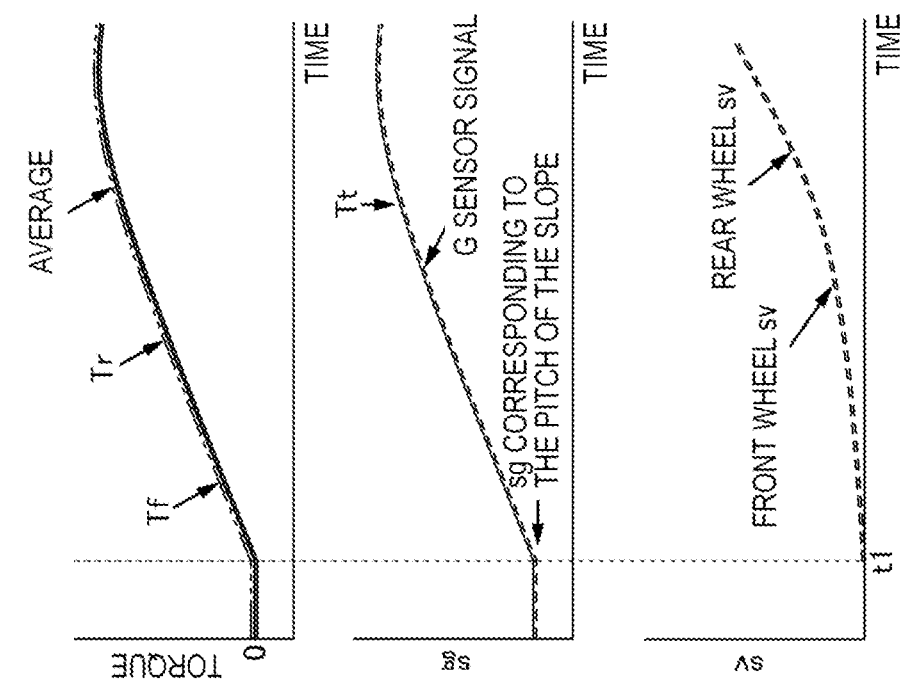

FIG. 4 shows time charts depicting situations where slip does not occur when the vehicle starts moving on an upward slope with a high road friction coefficient μ. FIG. 4(*a*) shows a comparative example in which the distribution processing at a sudden torque change is not carried out. FIG. 4(*b*) shows the Embodiment 1 in which the distribution processing at a sudden torque change is carried out. In these time charts, the torque distribution ratio St of the front and rear wheels is 1 to 1. The time charts show examples in which the vehicle starts moving from a parked state on an upward slope. In the parked state, the longitudinal acceleration sg of the longitudinal acceleration sensor 12 (hereinafter, referred to also as G sensor) indicates a value after offsetting an amount of the longitudinal acceleration sg corresponding to the pitch of the slope. The front motor torque command value is represented by Tf, and the rear motor torque command value is represented by Tr. The front wheel speed is represented by the front wheel sv, and the rear wheel speed is represented by the rear wheel sv.

According to the comparative example shown in FIG. 4(*a*), when the driver steps on the accelerator pedal and starts the vehicle at time t1, the torque commands Tf and Tr according to the accelerator pedal position and the distribution ratio St are outputted to the front and rear wheels. Average torque of the values Tf and Tr is increased with the increase of the values Tf and Tr. The front wheel sv and the rear wheel sv are accordingly increased together.

In contrast, according to the Embodiment 1 shown in FIG. 4(*b*), the accelerator-side correction gain K1 is set, and the correction amount upper limit value Tfhlim according to the longitudinal gradient SP is increased because the vehicle is on the upward slope. This results in a post-correction value Tf according to which the torque distribution to the front wheels is increased. On the other hand, the torque distribution to the rear wheels is reduced, and a post-correction value Tr is decreased. Total torque of the post-correction values Tf and Tr equals the demand torque Tt. The vehicle therefore travels in a similar manner to the comparative example, and the driver does not feel strangeness.

Figure 5A:
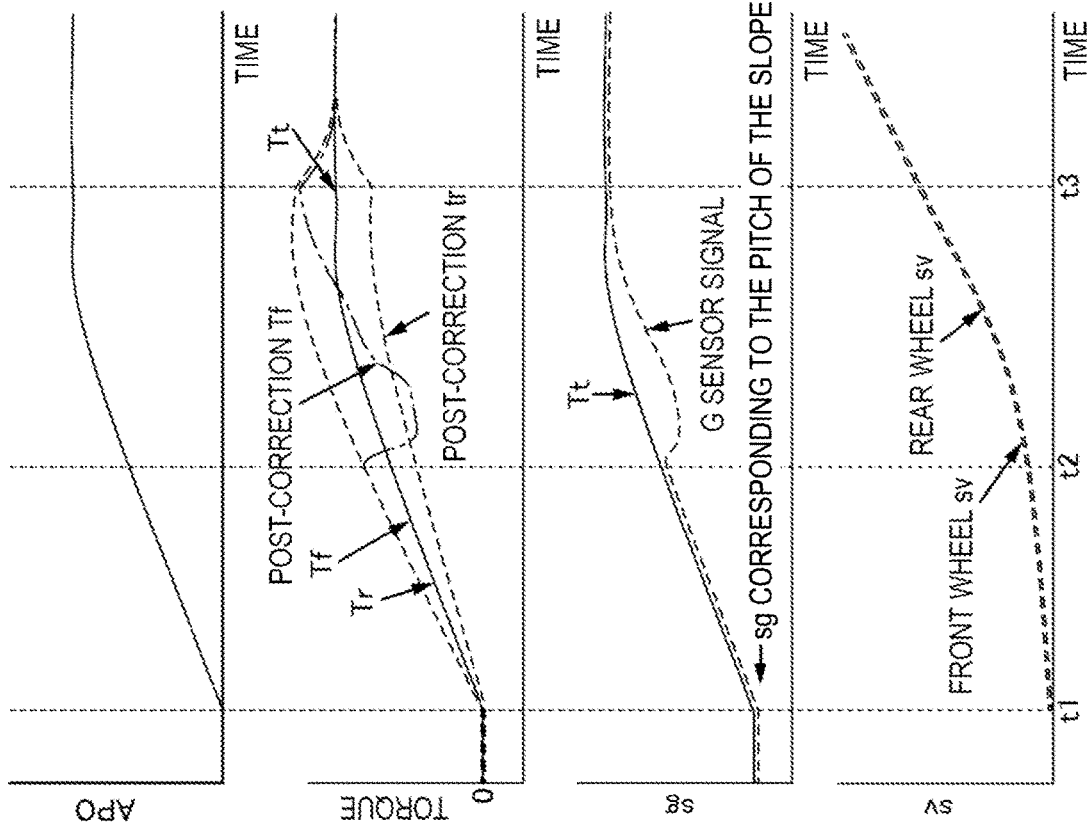
FIGS. 5A and 5B show time charts depicting situations where slip occurs when the vehicle starts moving on an upward slope with a low road friction coefficient μ.

FIG. 5 shows time charts depicting situations where slip occurs when the vehicle starts moving on an upward slope with a low road friction coefficient μ. FIG. 5(*a*) shows a comparative example in which the distribution processing at a sudden torque change is not carried out. FIG. 5(*b*) shows the Embodiment 1 in which the distribution processing at a sudden torque change is carried out. According to the comparative example shown in FIG. 5(*a*), when the driver further depresses the accelerator pedal and starts the vehicle at time t1, the torque commands Tf and Tr according to the accelerator pedal position are outputted to the front and rear wheels. Average torque of the front and rear wheels is increased with the increase of the values Tf and Tr. Both the front and rear wheels slip at the same time due to the low road friction coefficient μ, and the front wheel sv and the rear wheel sv are considerably increased together. The values Tf and Tr are then corrected by the slip control, and the post-slip control values Tf and Tr are outputted. Accordingly, the post-slip control values Tf and Tr are drastically decreased, and the front wheel sv and the rear wheel sv are drastically reduced, leading to a significant reduction in the longitudinal acceleration sg. In the example, a forward traveling state is successfully maintained after the slip control. However, if the front and rear wheels slip at the same time after the vehicle starts moving on a snowy upward slope, the snow on the surface is melted by the slip, and this might cause a further decrease in the road friction coefficient μ. In such event, the post-slip control values Tf and Tr corrected to suppress the slip become very small, and the small post-slip control values Tf and Tr are simultaneously outputted, which might hinder the vehicle from traveling on the upward slope.

Figure 5B:
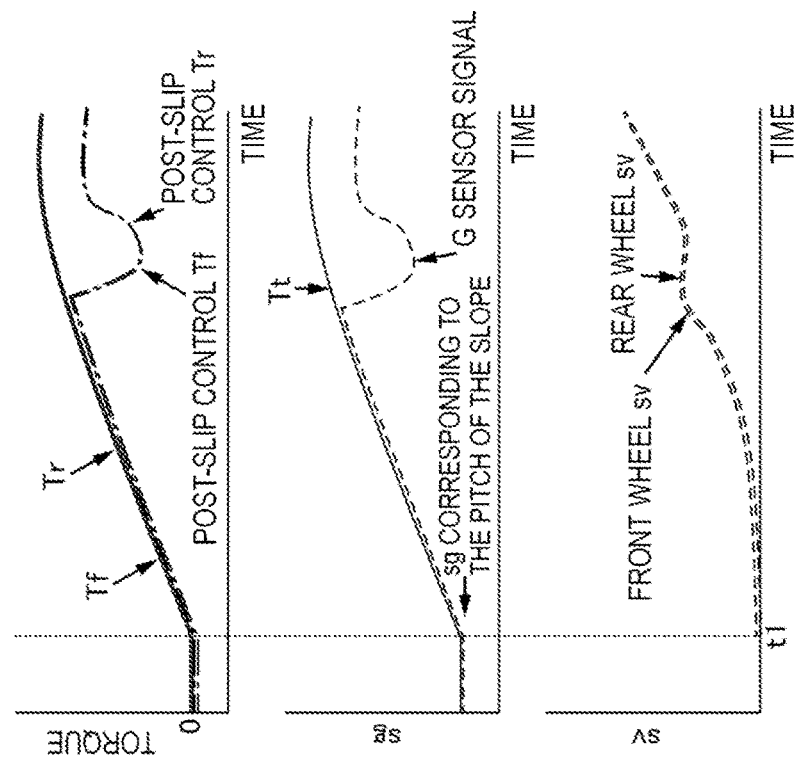

In contrast, according to the Embodiment 1 shown in FIG. 5(b), the accelerator-side correction gain K1 is set, and the correction amount upper limit value Tfhlim according to the longitudinal gradient SP is increased because the vehicle is on the upward slope. This results in the post-correction value Tf according to which the torque distribution to the front wheels is increased. On the other hand, the torque distribution to the rear wheels is reduced, and the post-correction value Tr is decreased.

At time t2, the front wheels slip, and the post-slip control value Tf is outputted. However, since there is no slip in the rear wheels, the value Tr is not drastically torqued down. Therefore, the longitudinal acceleration sg is prevented from being drastically reduced. Even if the slip reduces a lateral force of front wheel tires, the vehicle is stabilized by a lateral force of rear wheel tires. The value Tr is subsequently increased, and the value Tf is restored to some degree by the time when the rear wheels slip, which avoids a large slip of the rear wheels. Consequently, although the average torque is slightly lower than the driver's demand torque, the vehicle can smoothly start moving since the longitudinal acceleration sg is prevented from being drastically reduced as compared to the comparative example. In addition, avoidance of the simultaneous slip of the front and rear wheels on a snowy upward slope makes it possible to secure the lateral force of the tires and thus stabilize the vehicle, and also makes it possible to avoid an excessive decrease of the road friction coefficient μ and thus effectively avoid a situation in which the vehicle is unable to travel on an upward slope. When the accelerator pedal operation speed Δ APO is reduced at time t3, the accelerator-side correction gain K1 is decreased and eventually reaches zero. Accordingly, the values Tf and Tr gradually approximate to each other, and the torques according to the distribution ratio St are outputted.

As explained above, the Embodiment 1 provides the following operation and advantageous effects.

(1) The control apparatus for an electric vehicle including the front motor 1f (front electric motor) which outputs torque to the front wheels of a vehicle and the rear motor 1r (rear electric motor) which outputs torque to the rear wheels of the vehicle, includes the final torque limiting portion 109 (torque command portion) configured to output torque command values Tf and Tr to the front motor 1f and the rear motor 1r, and the distribution portion 600 at acceleration/deceleration (control portion), which is configured to implement such control that the difference between the torque command value Tf of the front motor 1f and the torque command value Tr of the rear motor 1r (hereinafter, referred to as front and rear wheel torque difference) is larger than a predetermined value while the torque command values Tf and Tr are being changed. This makes it possible to suppress the simultaneous drive or brake slip of the front and rear wheels.

(2) The distribution portion 600 at acceleration/deceleration increases the front and rear wheel torque difference as the longitudinal gradient SP of the road surface increases. This makes it possible to suppress the simultaneous slip of the front and rear wheels at the starting or deceleration of the vehicle on an upward slope with the low road friction coefficient μ, and also achieve a stable traveling state.

(3) The control apparatus includes the torque distribution portion 105 (calculation portion) configured to calculate the reference motor torque command values Ttfr (reference torque command values) based on the preset distribution ratio St (reference torque distribution ratio) of the front motor 1f and the rear motor 1r. After a change amount of the torque command values Tf and Tr becomes smaller than a predetermined value, the distribution portion 600 at acceleration/deceleration gradually restores the torque command values Tf and Tr to the reference motor torque command values Ttfr. In other words, it is hardly likely that the front and rear wheels slip at the same time when the torque change is minor, so that a stable traveling state can be achieved by restoring the torque command values Tf and Tr to the reference motor torque command values Ttfr.

(4) The control apparatus includes the torque distribution portion 105 configured to calculate the reference motor torque command values Ttfr based on the distribution ratio St of the front motor 1f and the rear motor 1r, which is previously set. The distribution portion 600 at acceleration/deceleration increases the front and rear wheel torque difference by changing the distribution ratio St. This makes it possible to satisfy the demand torque Tt and also suppress the simultaneous slip of the front and rear wheels.

(5) The for distribution portion 600 at acceleration/deceleration implements such control that the front and rear wheel torque difference is equal to or smaller than the correction amount upper limit value Tfhlim (predetermined value). This makes it possible to suppress an excessive correction and avoid an unnecessary increase of the front and rear wheel torque difference.

(6) The distribution portion 600 at acceleration/deceleration implements such control that the torque command value Tr of the rear motor 1r is smaller than the torque command value Tf of the front motor 1f. The stability associated with the yaw moment of the vehicle is highly correlated with the lateral force of the tires on the rear wheel side. Therefore, if the torque command on the rear wheel side is decreased, the lateral force of the rear wheel tires can be secured, and the stability of the vehicle can be also secured.

Embodiment 2

Figure 6:
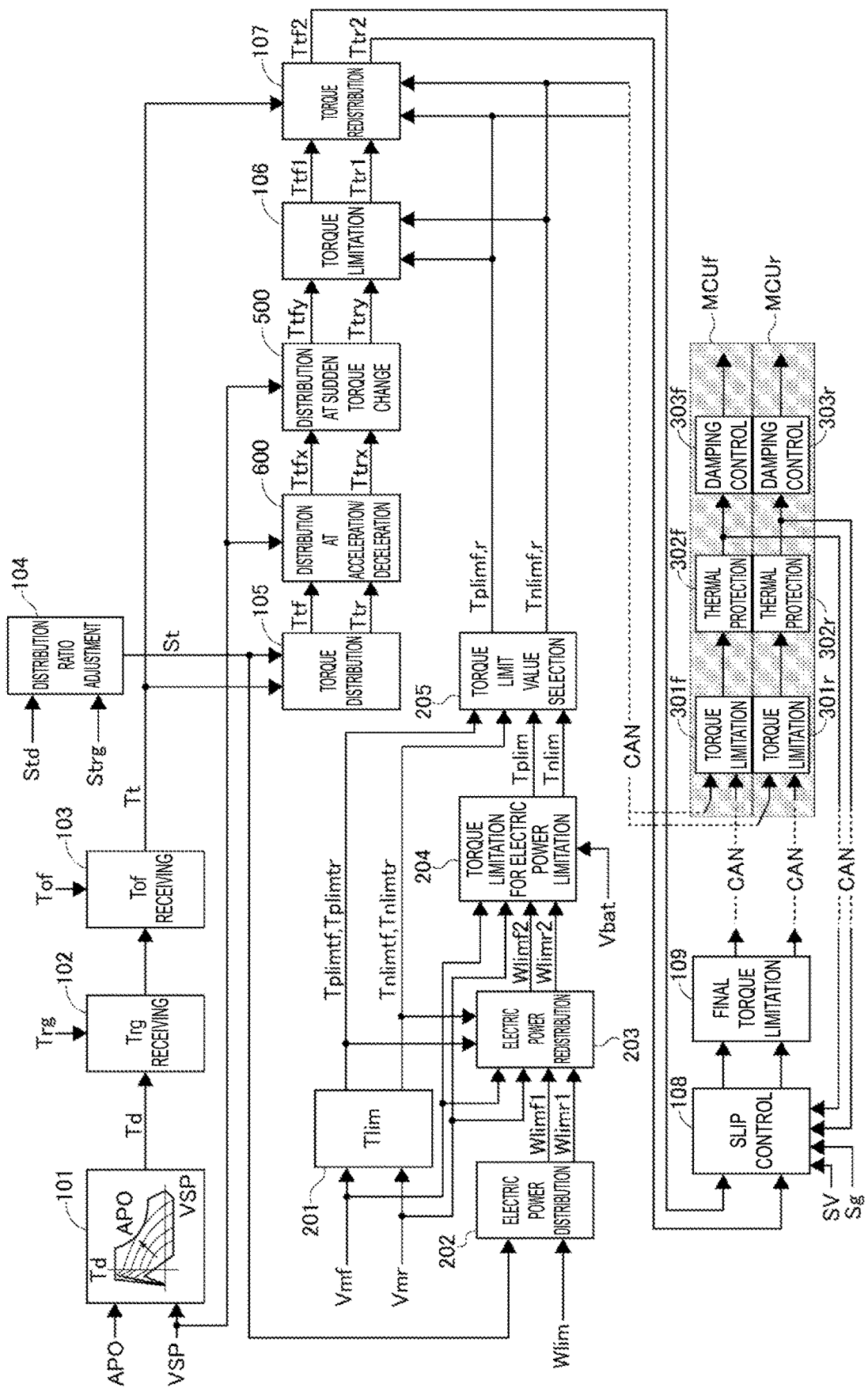
FIG. 6 is a control block diagram of an electric vehicle according to an Embodiment 2.

An Embodiment 2 will be now discussed. The Embodiment 2 is similar to the Embodiment 1 in basic constitution. The following discussion will refer only to differences. FIG. 6 is a control block diagram of an electric vehicle according to the Embodiment 2. The Embodiment 2 includes a distribution portion 500 at a sudden torque change between a torque distribution portion 105 and a distribution portion 600 at acceleration/deceleration. The distribution portion 500 at a sudden torque change makes such a correction as to avoid simultaneous slip of the front and rear wheels, which is caused by a sudden torque change, on the basis of the vehicle speed VSP, the reference front motor torque command value Ttf, and the reference rear motor torque command value Ttr. More specifically, the distribution portion 500 at a sudden torque change corrects the reference rear motor torque command value Ttr to a reference rear motor torque command value Ttry at a sudden torque change, which is obtained by delaying a torque response of the reference rear motor torque command value Ttr, as needed. At this time, if the vehicle is being decelerated, an amount of the torque reduced by the correction of the reference rear motor torque command value Ttr to the reference rear motor torque command value Ttry at a sudden torque change is added to the reference front motor torque command value Ttf, so that the reference front motor torque command value Ttf is corrected to the reference front motor torque command value Ttfy at a sudden torque change. The deceleration is thus ensured.

(Portion for Distribution at a Sudden Torque Change)

Figure 7:
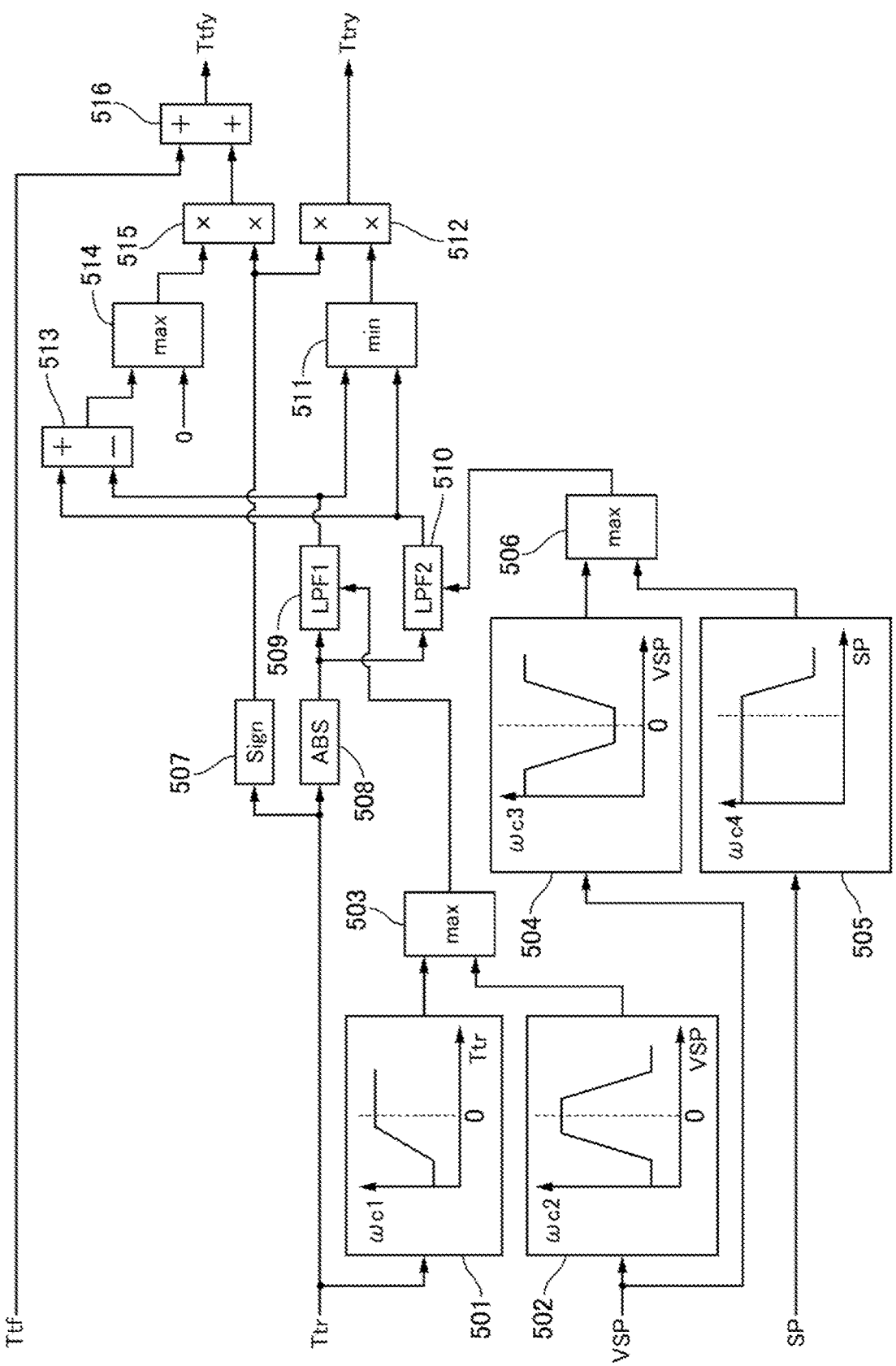
FIG. 7 is a control block diagram showing in detail a distribution portion at a sudden torque change according to the Embodiment 2.

FIG. 7 is a control block diagram showing in detail the distribution portion at a sudden torque change according to the Embodiment 1. A first cutoff frequency setting portion 501 sets a first cutoff frequency $\omega c1$ that is a candidate of a cutoff frequency to be used in a first low-pass filter 509 described later, on the basis of the reference rear motor torque command value Ttry at a sudden torque change. When the command value Ttry is a positive torque, the portion 501 sets the frequency $\omega c1$ to a relatively large value. When the command value Ttry is a negative torque, and an absolute value thereof is larger than a predetermined value, the portion 501 sets the frequency $\omega c1$ to a relatively small value. This increases a delay in torque response on the rear wheel side during rapid deceleration, and makes it possible to avoid simultaneous locking of the front and rear wheels and stabilize the vehicle. The torque response here means a temporal delay from a time point when the target torque starts changing to a time point when actual torque that is actually outputted catches up with the target torque. Therefore, a large delay in the torque response of the actual torque with respect to the target torque indicates that an achievement rate obtained by dividing the actual torque by the target torque is low after the target torque changes.

In still other words, the reference motor torque command value is a value that is set on the basis of the accelerator pedal position APO, so that the torque response is represented also by a value obtained by dividing an actual torque differential value by accelerator pedal opening speed $\Delta$APO (hereinafter, the value will be referred to as responsivity). A high torque response approximates the responsivity to 1, whereas a low torque response makes the responsivity lower than 1.

A second cutoff frequency setting portion 502 sets, on the basis of the vehicle speed VSP, a second cutoff frequency $\omega c2$ that is a candidate of a cutoff frequency to be used in the first low-pass filter 509 described later. Regardless of whether the vehicle travels forward or rearward, when the vehicle speed VSP is lower than a predetermined value, the second cutoff frequency setting portion 502 sets the frequency $\omega c2$ to a relatively large value, whereas when the vehicle speed VSP is higher than the predetermined value, the second cutoff frequency setting portion 502 sets the frequency $\omega c2$ to a relatively small value. This increases a delay in torque response on the rear wheel side during high-speed traveling, and makes it possible to avoid the simultaneous locking of the front and rear wheels and stabilize the vehicle.

A cutoff frequency selecting portion 503 for the first low-pass filter outputs the first cutoff frequency $\omega c1$ or the second cutoff frequency $\omega c2$, whichever cutoff frequency is higher, as a cutoff frequency for the first low-pass filter. Accordingly, when deceleration is large, and the vehicle speed is high, both the first cutoff frequency $\omega c1$ and the second cutoff frequency $\omega c2$ have small values. Therefore, the cutoff frequency is set to a small value in the first low-pass filter 509 to increase the delay in the torque response of the rear wheels. In other cases, either the first cutoff frequency $\omega c1$ or the second cutoff frequency $\omega c2$ has a large value, so that the cutoff frequency is set to a large value in the first low-pass filter 509. The responsivity is thus secured without causing a large delay in the torque response of the rear wheels.

A third cutoff frequency setting portion 504 sets, on the basis of the vehicle speed VSP, a third cutoff frequency $\omega c3$ that is a candidate of a cutoff frequency to be used in a second low-pass filter 510 described later. Regardless of whether the vehicle travels forward or rearward, the frequency $\omega c3$ is set to a relatively small value if the vehicle speed VSP is low, and the frequency $\omega c3$ is set to a relatively large value if the vehicle speed VSP is high. This increases a delay in torque response on the rear wheel side during low-speed traveling such as when the vehicle starts moving, and makes it possible to avoid the simultaneous locking of the front and rear wheels.

A fourth cutoff frequency setting portion 505 sets, on the basis of an estimated longitudinal gradient SP of a road surface, a fourth cutoff frequency $\omega c4$ that is a candidate of a cutoff frequency to be used in the second low-pass filter 510 described later. The longitudinal gradient SP may be estimated in any manner. For example, the longitudinal gradient SP may be estimated according to difference between a value of the longitudinal acceleration sensor 12 which detects the longitudinal acceleration sg of the vehicle and a differential value of the vehicle speed VSP or may be estimated using another estimation means. When the longitudinal gradient SP is large, that is, when the vehicle travels on an upward slope, the frequency $\omega c3$ is set to a relatively small value. When the vehicle travels on a flat road or a downward slope, the frequency $\omega c3$ is set to a relatively large value. This makes it possible to avoid the simultaneous slip of the front and rear wheels when the vehicle starts moving on an upward slope or in other like situations to prevent downward sliding or like motions of the vehicle.

A cutoff frequency selecting portion 506 for the second low-pass filter outputs the third cutoff frequency $\omega c3$ or the fourth cutoff frequency $\omega c4$, whichever cutoff frequency is higher, as a cutoff frequency for the second low-pass filter. When the vehicle travels at a low speed on an upward slope, both the third cutoff frequency $\omega c3$ and the fourth cutoff frequency $\omega c4$ have small values, so that the cutoff frequency is set to a small value in the second low-pass filter 510 to increase the delay in the torque response of the rear wheels. In other cases, either the third cutoff frequency $\omega c3$ or the fourth cutoff frequency $\omega c4$ has a large value. The cutoff frequency is therefore set to a large value in the second low-pass filter 510. The responsivity is thus secured without causing a large delay in torque response of the rear wheels.

A sign extracting portion 507 extracts only a sign of a first reference rear motor torque command value Ttr and then outputs the extracted sign to a first sign processing portion 515 and a second sign processing portion 512, which will be described later. An absolute value processing portion 508 converts the first reference rear motor torque command value Ttr into an absolute value and outputs the absolute value to the first low-pass filter 509. In the first low-pass filter 509 and the second low-pass filter 510, the absolute value of the first reference rear motor torque command value Ttr is subjected to low-pass filter processing on the basis of a preset cutoff frequency.

A rear motor torque command value selecting portion 511 selects and outputs a first command value having passed through the first low-pass filter 509 or a second command value having passed through the second low-pass filter 510, whichever command value is smaller. In other words, when a response delay is applied to the torque of the rear wheels according to the traveling condition, a command value on which the response delay is set is selected. A second sign processing portion 512 multiplies the command value selected in the rear motor torque command value selecting portion 511 by the sign extracted in the sign extracting portion 507, and then outputs the reference rear motor torque command value Ttry at a sudden torque change.

A difference calculation portion 513 deducts the first command value outputted from the first low-pass filter 509 from the second command value outputted from the second low-pass filter 510 to calculate a difference. In other words, when deceleration is large, and the vehicle speed is high, the first command value is decreased due to a low cutoff frequency, whereas the second command value is increased due to a high cutoff frequency. At this time, if the rear wheels are reduced in torque response while the torque of the front wheels remains unchanged, total deceleration of the front and rear wheels in a zone where the response is reduced is likely to be smaller than demand deceleration. To solve this issue, the amount of the torque reduced in the rear wheels is calculated from the difference between the second command value and the first command value and then added to the front wheel side, to thereby carry out such compensation that the total deceleration of the front and rear wheels equals the demand deceleration.

A compensation processing portion 514 selects and outputs the difference calculated in the difference calculation portion 513 or zero, whichever is larger. The first sign processing portion 511 multiplies the command value outputted from the compensation processing portion 514 by the sign extracted in the sign extracting portion 507 and then outputs a front compensation value. A first reference front motor torque command value calculating portion 516 adds the front compensation value to the reference front motor torque command value Ttf and outputs a reference front motor torque command value Ttfy at a sudden torque change. A sign of the reference front motor torque command value Ttf during deceleration is negative, and the front compensation value is negative. The absolute value is therefore large, which satisfies the demand deceleration.

More specifically, when deceleration is large, and the vehicle speed is high, a result obtained by deducting the first command value from the second command value is a positive value. This difference is therefore selected, and the deceleration is compensated by applying the torque corresponding to the difference to the front wheel side. On the other hand, when the vehicle starts moving on an upward slope or in other like situations, a result obtained by deducting the first command value from the second command value is a negative value. In this case, zero is selected, and the torque corresponding to the difference is not particularly compensated to the front wheel side. This is because the driver hardly notices a small insufficiency in torque, if any, when starting the vehicle on an upward slope, and also because a front wheel slip caused by increasing a front wheel torque is intended to be avoided.

[Distribution Processing at a Sudden Torque Change]

Figure 8A:
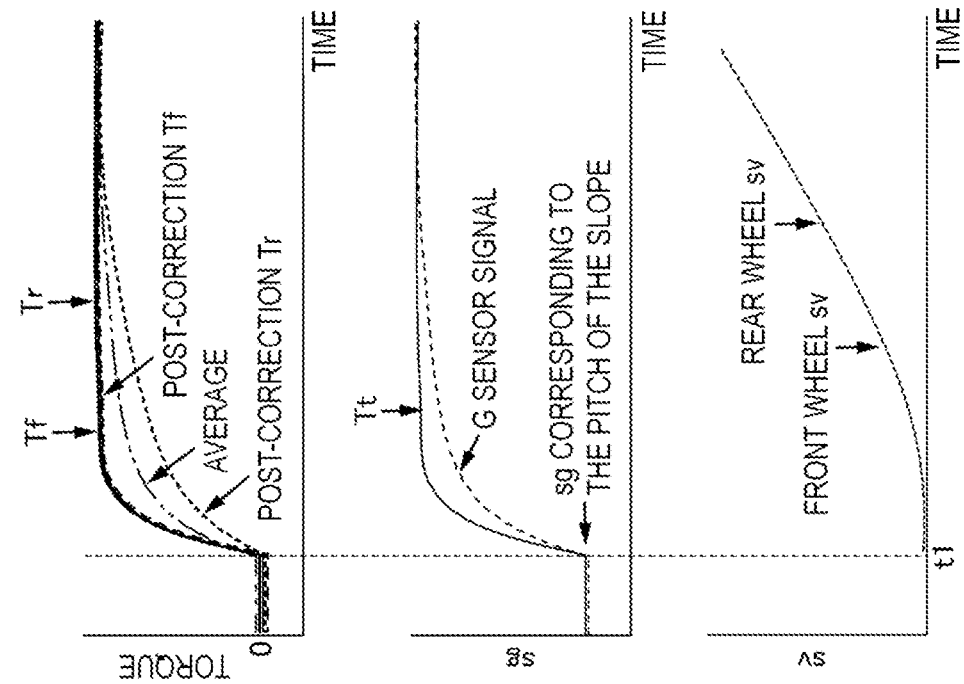
FIGS. 8A and 8B show time charts depicting situations where slip does not occur when the vehicle starts moving on an upward slope with a high road friction coefficient μ.
Figure 8B:
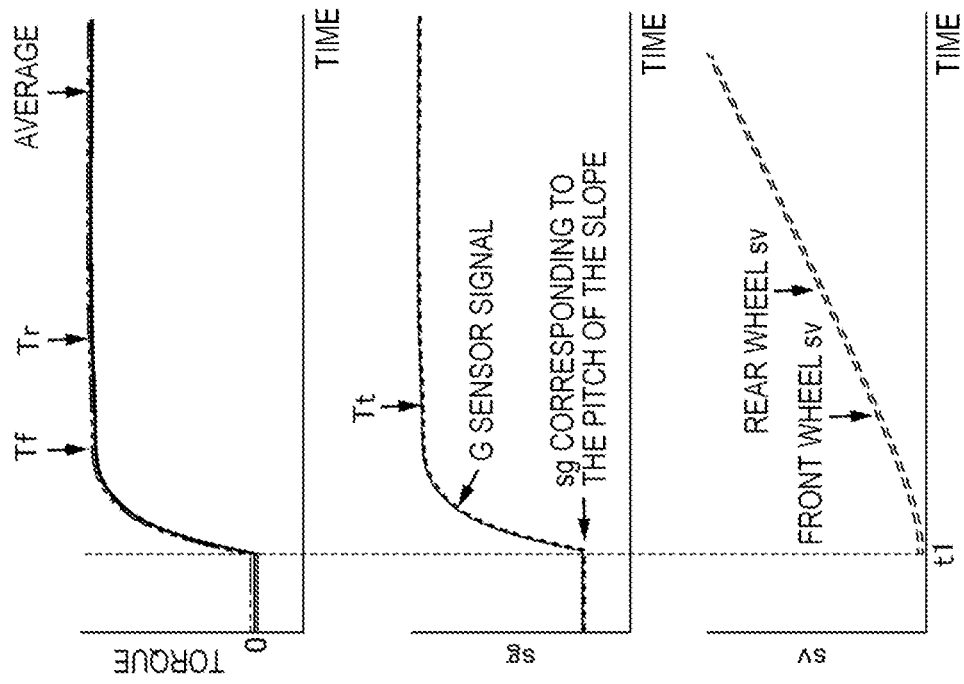

(Operation when the Vehicle Starts Moving on an Upward Slope) FIG. 8 shows time charts depicting situations where slip does not occur when the vehicle starts moving on an upward slope with a high road friction coefficient μ. FIG. 8(a) shows a comparative example in which the distribution processing at a sudden torque change is not carried out. FIG. 8(b) shows the Embodiment 1 in which the distribution processing at a sudden torque change is carried out. In these time charts, the torque distribution ratio St of the front and rear wheels is 1 to 1. The time charts show examples in which the vehicle starts moving from a parked state on an upward slope. In the parked state, the longitudinal acceleration sg of the longitudinal acceleration sensor 12 (hereinafter, referred to also as G sensor) indicates a value after offsetting an amount of the longitudinal acceleration sg corresponding to the pitch of the slope. The front motor torque command value is represented as Tf, and the rear motor torque command value is represented as Tr. The front wheel speed is represented as front wheel sv, and the rear wheel speed is represented as rear wheel sv.

According to the comparative example shown in FIG. 8(a), if the driver further depresses an accelerator pedal and starts the vehicle at time t1, the torque commands Tf and Tr according to the accelerator pedal position are outputted to the front and rear wheels, and average torque of the values Tf and Tr is increased with the increase of the values Tf and Tr. The front wheel sv and the rear wheel sv are accordingly increased together.

Comparatively, according to the Embodiment 1 shown in FIG. 8(b), both the third cutoff frequency $\omega c3$ and the fourth cutoff frequency $\omega c4$ have small values. Correction is therefore made so that response of the value Tr is delayed. At this time, the value Tf is not applied with a compensation torque. The average torque is reduced slightly lower than the driver's demand torque. The front wheel sv and the rear wheel sv are increased a slightly delayed manner as compared to those in the comparative example. However, when starting the vehicle on an upward slope, the driver recognizes that the condition is different from when starting the vehicle on a flat road. Therefore, the driver does not feel strangeness even if a slight delay occurs in acceleration. Even if the cutoff frequency is set to a small value, the reference motor torque command values Ttfr do not suddenly change when the accelerator pedal opening speed Δ APO is low. Thus, control takes place without a particular delay in response. If the accelerator pedal opening speed Δ APO is high, the reference motor torque command values Ttfr suddenly change, so that a response delay is set. In other words, there is a small difference between responsivity on the front wheel side and responsivity on the rear wheel side when the accelerator pedal opening speed Δ APO is low, whereas there is a large difference between the responsivity on the front wheel side and the responsivity on the rear wheel side when the accelerator pedal opening speed Δ APO is high.

Figure 9A:
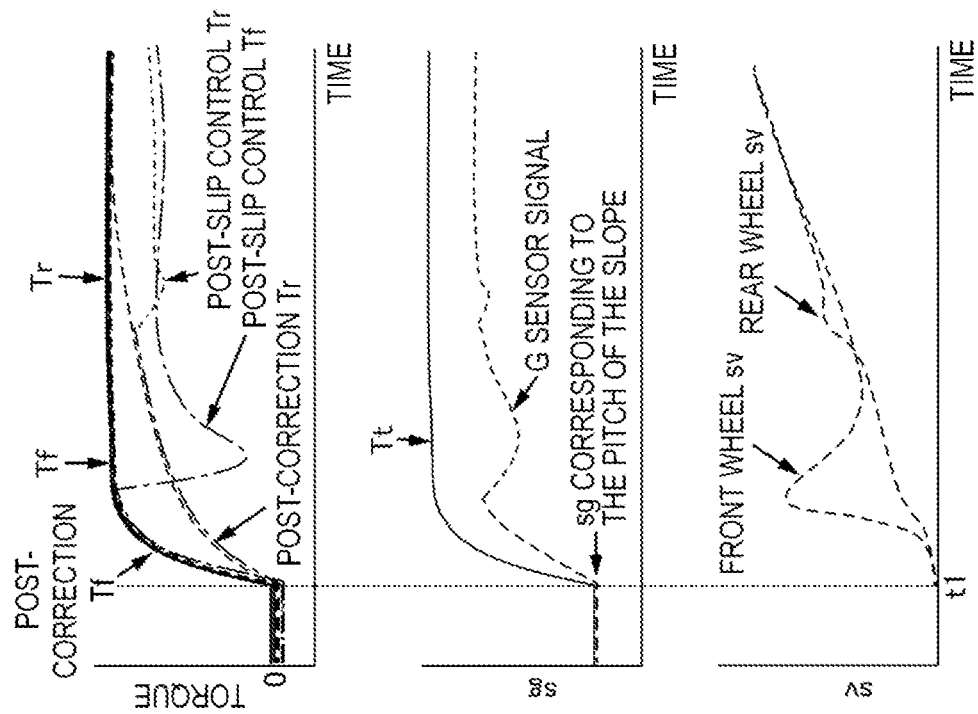
FIGS. 9A and 9B show time charts depicting situations where slip occurs when the vehicle starts moving on an upward slope with a low road friction coefficient μ.
Figure 9B:
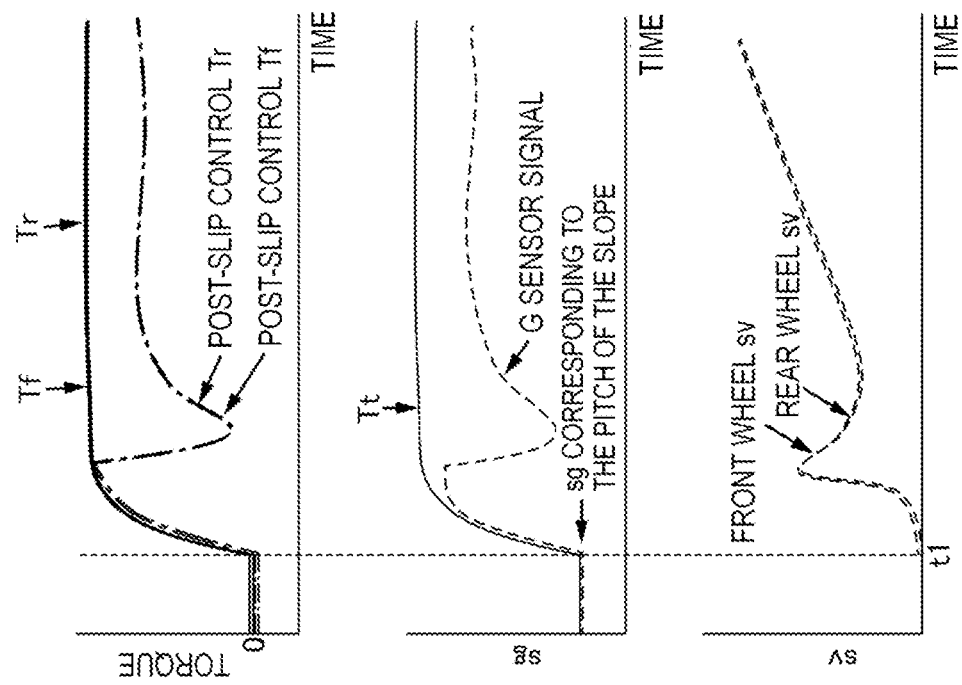

FIG. 9 shows time charts depicting situations where slip occurs when the vehicle starts moving on an upward slope with a low road friction coefficient μ. FIG. 9(a) shows a comparative example in which the distribution processing at a sudden torque change is not carried out. FIG. 9(b) shows the Embodiment 1 in which the distribution processing at a sudden torque change is carried out. According to the comparative example shown in FIG. 9(a), when the driver depresses the accelerator pedal and starts the vehicle at time t1, the torque commands Tf and Tr according to the accelerator pedal position are outputted to the front and rear wheels. Average torque of the front and rear wheels is increased with the increase of the values Tf and Tr. At this time, both the front and rear wheels simultaneously slip due to the low road friction coefficient μ, and the front wheel sv and the rear wheel sv are considerably increased together. The values Tf and Tr are then corrected by slip control, and post-slip control values Tf and Tr are outputted. The post-slip control values Tf and Tr are significantly decreased, and both the front wheel sv and the rear wheel sv are drastically reduced. This brings a drastic reduction in the longitudinal acceleration sg. In the foregoing example, the vehicle successfully continues to travel forward after the slip control is implemented. However, if the front and rear wheels slip at the same time after the vehicle starts moving on a snowy upward slope, the snow on a surface is melted by the slip, and this might cause a further decrease in the road friction coefficient μ. If this happens, the post-slip control values Tf and Tr corrected to suppress the slip become very small, and the small post-slip control values Tf and Tr are simultaneously outputted, which might hinder the vehicle from traveling on the upward slope.

In contrast, according to the Embodiment 1 shown in FIG. 9(b), both the third cutoff frequency $\omega c3$ and the fourth cutoff frequency $\omega c4$ have small values. Correction is therefore made so that the response of the value Tr is delayed. At this time, the value Tr is smaller than the value Tf. Therefore, the front wheels slip first, followed by output of the post-slip control value Tf. Since there is no slip in the rear wheels, the value Tr is not drastically torqued down. The longitudinal acceleration sg is thus prevented from being drastically decreased. Even if a lateral force of front wheel tires is reduced due to the front wheel slip, the vehicle can be stabilized by a lateral force of rear wheel tires. The value Tr is thereafter increased, and by the time when the rear wheels slip, the value Tf is restored to some degree. This avoids a large slip of the rear wheels. Although the average torque is reduced slightly lower than the driver's demand torque, the vehicle can smoothly starts moving since unlike the comparative example, a drastic reduction in the longitudinal acceleration sg is prevented. Since the simultaneous slip of the front and rear wheels is avoided on a snowy upward slope, the lateral force of the tires is secured to stabilize the vehicle. It is also possible to avoid an excessive decrease in the road friction coefficient $\mu$, which effectively avoids a situation in which the vehicle is unable to travel on an upward slope.

(Operation During Deceleration)

Figure 10A:
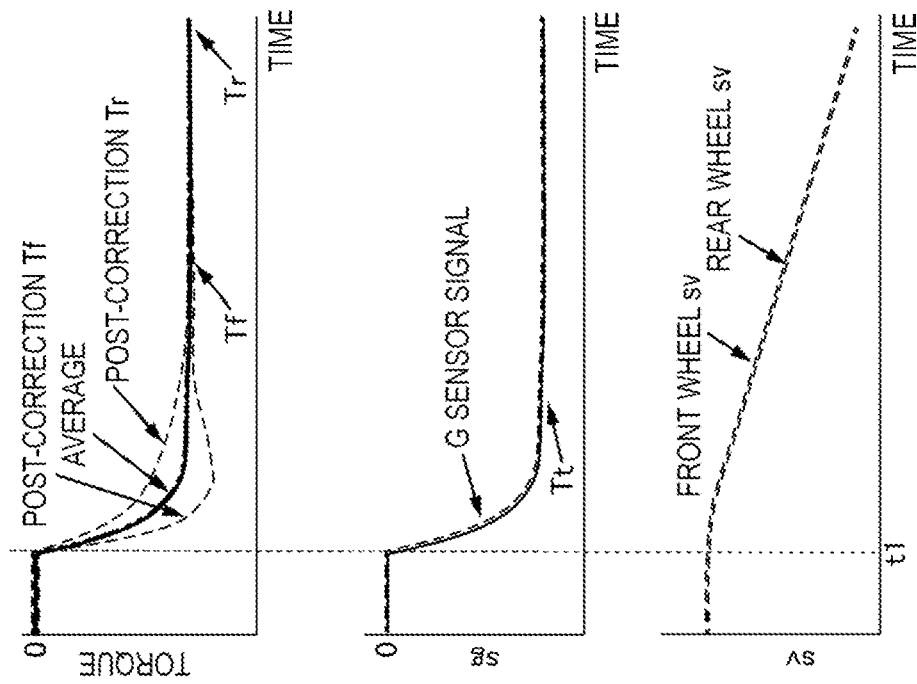
FIGS. 10A and 10B show time charts depicting situations where slip does not occur when the vehicle is decelerated on a flat road with a high road friction coefficient μ.
Figure 10B:
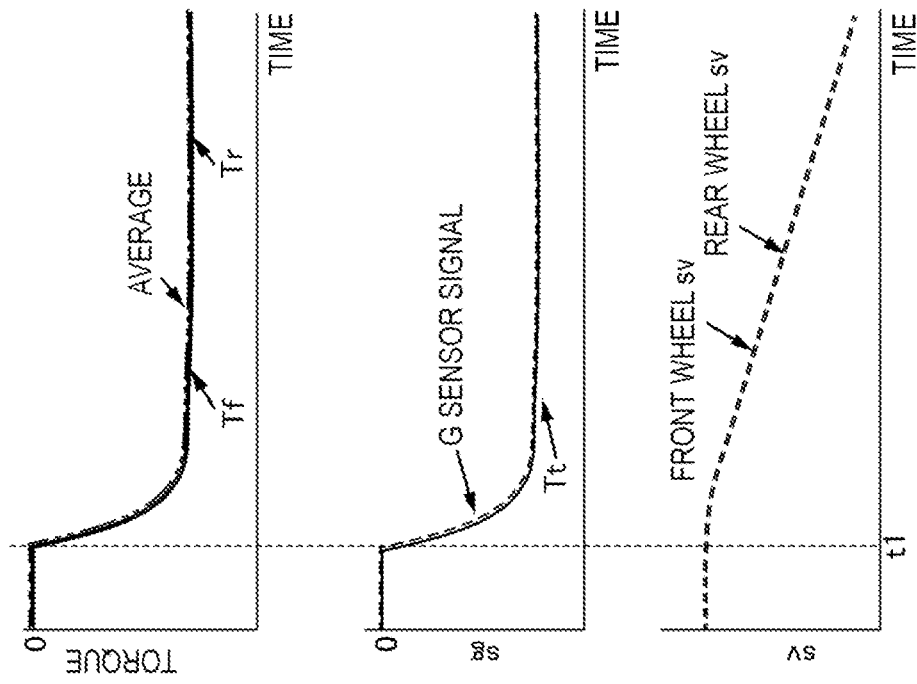

FIG. 10 shows time charts depicting situations where slip does not occur when the vehicle is decelerated on a flat road with a high road friction coefficient $\mu$. FIG. 10(a) shows a comparative example in which the distribution processing at a sudden torque change is not carried out. FIG. 10(b) shows the Embodiment 1 in which the distribution processing at a sudden torque change is carried out. In these time charts, the torque distribution ratio St of the front and rear wheels is 1 to 1. The time charts show examples in which the accelerator pedal is released from a state where the vehicle travels at a predetermined high speed on a flat road, and the vehicle is thus decelerated at deceleration according to a predetermined coast torque. During deceleration, the vehicle is decelerated by generating regenerative torques of the front motor 1f and the rear motor 1r so as to satisfy the demand deceleration.

According to the comparative example shown in FIG. 10(a), when the driver releases the accelerator pedal to provide the demand deceleration at time t1, the torque commands Tr and Tr according to the demand deceleration are outputted to the front and rear wheels. Average torque of the values Tf and Tr is reduced with the decrease of the values Tf and Tr. Therefore, the front wheel sv and the rear wheel sv are reduced together. On the other hand, according to the Embodiment 1 shown in FIG. 10(b), the vehicle travels at a high speed and is also decelerated. Both the first cutoff frequency $\omega c1$ and the second cutoff frequency $\omega c2$ therefore have small values. Correction is made so that the response of the value Tr is delayed. The delay in response of the value Tr incurs an insufficiency in deceleration, so that an amount of the torque reduced in the rear wheels is added to the front wheel side. Compensation is carried out so that total deceleration of the front and rear wheels equals the demand deceleration. As with the comparative example, the front wheel sv and the rear wheel sv are reduced together, and the driver does not feel strangeness.

Figure 11A:
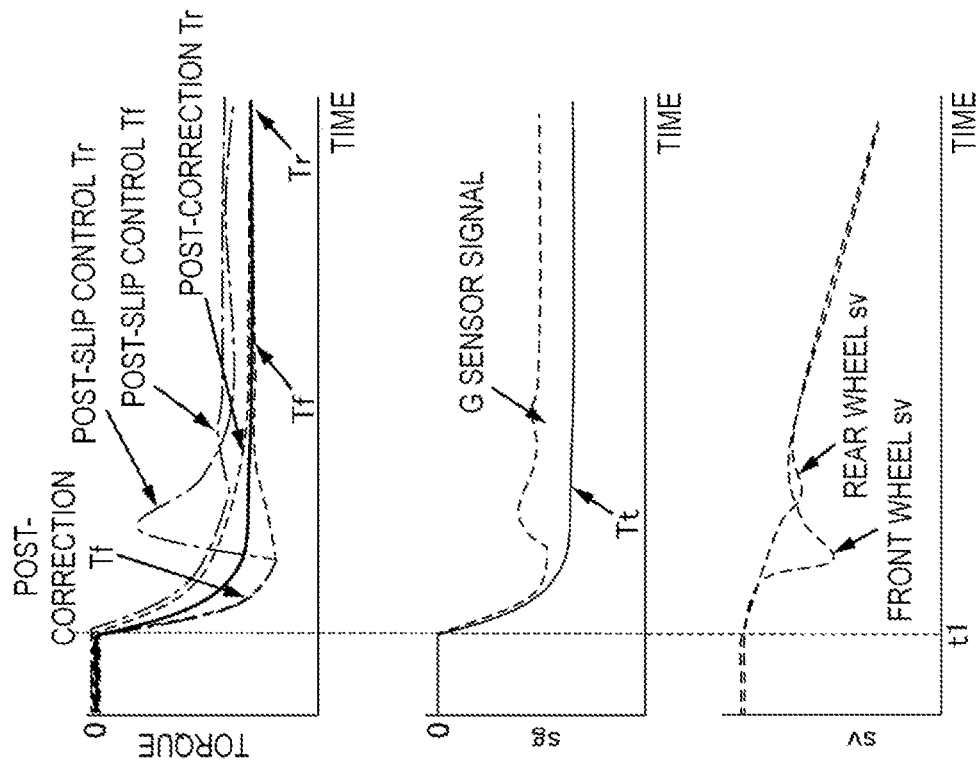
FIGS. 11A and 11B show time charts depicting situations where slip occurs when the vehicle is decelerated on a flat road with a low road friction coefficient μ.
Figure 11B:
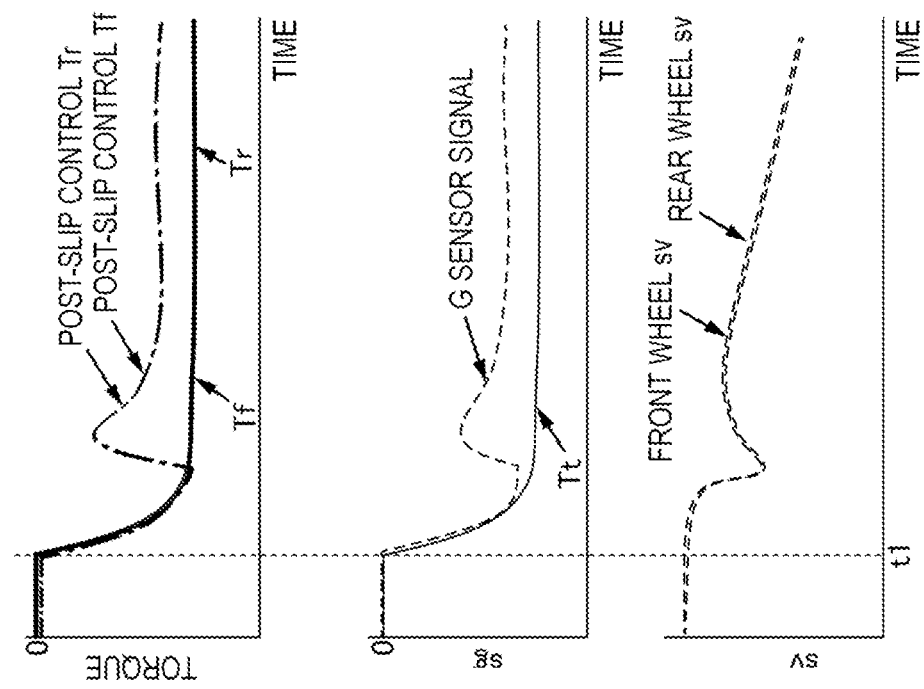

FIG. 11 shows time charts depicting situations where slip occurs when the vehicle is decelerated on a flat road with the low road friction coefficient $\mu$. FIG. 11(a) shows a comparative example in which the distribution processing at a sudden torque change is not carried out. FIG. 11(b) shows the Embodiment 1 in which the distribution processing at a sudden torque change is carried out. According to the comparative example shown in FIG. 11(a), when the driver releases the accelerator pedal to provide the demand deceleration at time t1, the torque commands Tf and Tr according to the demand deceleration are outputted to the front and rear wheels. Average torque of the front and rear wheels is also increased with the increase of the values Tf and Tr. At this time, a brake slip occurs in both the front and rear wheels at the same time due to the low road friction coefficient $\mu$. The front wheel sv and the rear wheel sv have a locking tendency and are drastically reduced. The slip control is then implemented to correct the values Tf and Tr, and the post-slip control values Tf and Tr are outputted. Absolute values of the post-slip control values Tf and Tr are drastically decreased (vary upward in the time chart shown in FIG. 11(a)), which causes a considerably loose feeling on deceleration.

In contrast, according to the Embodiment 1 shown in FIG. 11(b), both the first cutoff frequency $\omega c1$ and the second cutoff frequency $\omega c2$ have small values. Correction is therefore made so that the response of the value Tr is delayed. An amount of deceleration reduced by the correction is added to the value Tf. As a result, the values Tr and Tf become different values, while the demand deceleration is satisfied. The value Tr has an absolute value smaller than an absolute value of the value Tf. Thus, a brake slip occurs in the front wheels first, and the post-slip control value Tf is outputted. However, since there is no brake slip in the rear wheels, the absolute value of the value Tr is not drastically torqued down. This makes it possible to prevent the considerably loose feeling on deceleration. Even if the lateral force of the front wheel tires is reduced along with the brake slip, the vehicle can be stabilized by the lateral force of the rear wheel tires. Thereafter, the absolute value of the value Tr is also increased. The value Tf is restored to some degree by the time when the rear wheels slip, which avoids large brake slip of the rear wheels. Since the loose feeling on deceleration is suppressed unlike the comparative example, the vehicle can be more smoothly decelerated. Furthermore, since the simultaneous slip of the front and rear wheels is avoided, the lateral force of the tires is secured, stabilizing the vehicle and avoiding an excessive decrease in the road friction coefficient $\mu$.

As explained above, the Embodiment 1 provides the following operation and advantageous effects.

(7) The control apparatus for an electric vehicle including the front motor 1f (front electric motor) which outputs torque to the front wheels of a vehicle, and the rear motor 1r (rear electric motor) which outputs torque to the rear wheels of the vehicle, includes: the torque distribution portion 105 (target torque calculation portion) configured to calculate the reference front motor torque command value Ttf and the reference rear motor torque command value Ttr (referred to also as reference motor torque command values Ttfr), which are the target torques for the front motor 1f and the rear motor 1r; the final torque limiting portion 109 (torque command portion) configured to output the final torque command value Tt3 to the front motor 1f and the rear motor 1r; and the distribution portion 500 at a sudden torque change (control portion), which is configured to implement such control that an achievement rate of the final torque command value Tt3 with respect to the reference motor torque command values Ttfr in either one of the front motor 1*f* and the rear motor 1*r* is lower than an achievement rate in the other motor. In other words, assuming that a value obtained by dividing the actual torque differential value by the accelerator pedal opening speed Δ APO is "responsivity," the difference is small between the responsivity on the front wheel side and the responsivity on the rear wheel side when the accelerator pedal opening speed Δ APO is low, whereas the difference is large between the responsivity on the front wheel side and the responsivity on the rear wheel side when the accelerator pedal opening speed Δ APO is high. This makes it possible to suppress simultaneous drive or brake slip of the front and rear wheels.

(8) The torque is reduced by reducing the achievement rate in either one of the front motor 1*f* and the rear motor 1*r*. The distribution portion 500 at a sudden torque change compensates the reduced torque in the other one of the front motor 1*f* and the rear motor 1*r*. During deceleration, therefore, even if the actual torque on the rear wheel side is reduced, the demand torque Tt can be secured by compensating the torque on the front wheel side.

(9) When the vehicle travels at a predetermined or higher speed, and the reference motor torque command values Ttfr) is a negative value indicative of deceleration, the distribution portion 500 at a sudden torque change reduces the achievement rate in either one of the front motor 1*f* and the rear motor 1*r* as compared to other situations. This makes it possible to suppress the simultaneous locking of the front and rear wheels when the vehicle is decelerated at the predetermined or higher speed, and thus secure the stability of the vehicle.

(10) The torque is reduced by reducing the achievement rate in either one of the front motor 1*f* and the rear motor 1*r*. The distribution portion 500 at a sudden torque change does not compensate the reduced torque in the other one of the front motor 1*f* and the rear motor 1*r*. In other words, even if the actual torque becomes slightly lower than the demand torque Tt when the vehicle starts moving on an upward slope or in other like situations, the driver is hardly likely to feel strangeness. Furthermore, if the torque of the other one of the front motor 1*f* and the rear motor 1*r* is increased by compensating the torque in the other one of the front motor 1*f* and the rear motor 1*r*, there is a possibility that slip is prone to occur during the travel at the low road friction coefficient μ. This makes it possible to suppress slip without giving the driver a feeling of strangeness.

(11) When the vehicle travels at a lower speed than the predetermined speed, and the longitudinal gradient SP of a road surface has a predetermined or higher value, the distribution portion 500 at a sudden torque change reduces the achievement rate in either one of the front motor 1*f* and the rear motor 1*r* as compared to other situations. In other words, even if the actual torque becomes slightly lower than the demand torque Tt when the vehicle starts moving on an upward slope or in other like situations, the driver is hardly likely to feel strangeness. If the front and rear wheels slip at the same time after the vehicle starts moving, for example, on a snowy upward slope, the snow on the surface is melted by the slip, and the road friction coefficient μ might be further decreased. In addition, the post-slip control values Tf and Tr corrected to suppress the slip become very small, and the small post-slip control values Tf and Tr are simultaneously outputted. The vehicle then might be unable to travel on the upward slope. To solve this issue, when the vehicle travels at a lower speed than the predetermined speed, and the longitudinal gradient SP of the road surface has the predetermined or higher value, the achievement rate in either one of the front motor 1*f* and the rear motor 1*r* is reduced as compared to other situations. By so doing, the simultaneous slip of the front and rear wheels can be suppressed, and a stable traveling state can be achieved.

(12) The distribution portion 500 at a sudden torque change reduces the achievement rate in either one of the front motor 1*f* and the rear motor 1*r* at the starting or deceleration of the vehicle when the longitudinal gradient SP of the road surface has the predetermined or higher value. This makes it possible to suppress the simultaneous slip of the front and rear wheels and achieve the stable traveling state.

(13) The one motor of the motors is the rear motor 1*r*. The stability associated with yaw moment of the vehicle is highly correlated with the lateral force of the tires on the rear wheel side. Therefore, the stability of the vehicle can be secured by delaying the torque response on the rear wheel side.

The Embodiment 1 appropriately sets the cutoff frequency of the low-pass filter processing to delay the torque response on the rear wheel side. The torque response on the rear wheel side may be delayed in another way. For example, a timer or the like may be used to delay the timing to output the torque commands to the rear wheels. Also, the response may be delayed by limiting the change of the torque command values through limiter processing. The torque response thus may be delayed in any manner.

Other aspects which can be understood from the above-described embodiments will be discussed below.

A control apparatus for an electric vehicle including a front electric motor which outputs torque to front wheels of a vehicle and a rear electric motor which outputs torque to rear wheels of the vehicle, includes: a torque command portion configured to output torque command values to the front electric motor and the rear electric motor; and a control portion configured to control the front electric motor and the rear electric motor so that a difference between the torque command value of the front electric motor and the torque command value of the rear electric motor is larger than a predetermined value while the torque command values changes. In a more preferable aspect according to the foregoing aspect, the control portion increases the difference as a longitudinal gradient of a road surface increases. In another preferable aspect according to either one of the foregoing aspects, the control apparatus includes a calculation portion configured to calculate reference torque command values based on a preset reference torque distribution ratio of the front electric motor and the rear electric motor. The control portion gradually restores the torque command values to the reference torque command values after a change amount of the torque command values becomes smaller than a predetermined value. In still another preferable aspect according to any one of the foregoing aspects, the control apparatus includes a calculation portion configured to calculate reference torque command values based on a preset reference torque distribution ratio of the front electric motor and the rear electric motor. The control portion increases the difference by changing the reference torque distribution ratio. In still another aspect according to any one of the foregoing aspects, the control portion controls the front electric motor and the rear electric motor so that the difference is equal to or smaller than a preset value. In still another aspect according to any one of the foregoing aspects, the control portion controls the front electric motor and the rear electric motor so that the torque command value of the rear electric motor is smaller than the torque command value of the front electric motor.

From another perspective, a control apparatus for an electric vehicle including a front electric motor which outputs torque to front wheels of a vehicle and a rear electric motor which outputs torque to rear wheels of the vehicle, includes a control portion configured to control the front electric motor and the rear electric motor so that a difference between the torque command value of the front electric motor and the torque command value of the rear electric motor increases as the longitudinal gradient of the road surface increases. In a more preferable aspect according to the foregoing aspect, the control portion controls the front electric motor and the rear electric motor so that the difference is larger than a predetermined value while the torque command values changes. In a more preferable aspect according to the foregoing aspect, the control portion gradually restores the torque command values toward the reference torque command values based on the preset reference torque distribution ratio of the front electric motor and the rear electric motor, after the change amount of the torque command values becomes smaller than the predetermined value.

From another perspective, a control method for an electric vehicle including a front electric motor which outputs torque to front wheels of a vehicle and a rear electric motor which outputs torque to rear wheels of the vehicle, includes: outputting torque command values to the front electric motor and the rear electric motor; and controlling the front electric motor and the rear electric motor so that a difference between the torque command value of the front electric motor and the torque command value of the rear electric motor is larger than a predetermined value while the torque command values changes. In a more preferable aspect according to the foregoing aspect, the controlling the front electric motor and the rear electric motor includes increasing the difference as a longitudinal gradient of a road surface increases. In another preferable aspect according to either one of the foregoing aspects, the control method includes calculating reference torque command values based on a preset reference torque distribution ratio of the front electric motor and the rear electric motor. The controlling the front electric motor and the rear electric motor includes gradually restoring the torque command values to the reference torque command values after a change amount of the torque command values becomes smaller than a predetermined value. In another preferable aspect according to any one of the foregoing aspects, the control method includes calculating reference torque command values based on a preset reference torque distribution ratio of the front electric motor and the rear electric motor. The controlling the front electric motor and the rear electric motor includes increasing the difference by changing the reference torque distribution ratio. In still another preferable aspect according to any one of the foregoing aspects, the controlling the front electric motor and the rear electric motor includes controlling the front electric motor and the rear electric motor so that the difference is equal to or smaller than a preset predetermined value. In still another preferable aspect according to any one of the foregoing aspects, the controlling the front electric motor and the rear electric motor includes controlling the front electric motor and the rear electric motor so that the torque command value of the rear electric motor is smaller than the torque command value of the front electric motor.

From another perspective, a control system for an electric vehicle includes a front electric motor configured to output torque to front wheels of a vehicle, a rear electric motor configured to output torque to rear wheels of the vehicle, and a control unit configured to control the front electric motor and the rear electric motor. The control unit includes: a torque command portion configured to output torque command values to the front electric motor and the rear electric motor; and a control portion configured to control the front electric motor and the rear electric motor so that a difference between the torque command value of the front electric motor and the torque command value of the rear electric motor is larger than a predetermined value while the torque command values changes. In a more preferable aspect according to the foregoing aspect, the control portion increases the difference as a longitudinal gradient of a road surface increases. In another preferable aspect according to either one of the foregoing aspects, the control system includes a calculation portion configured to calculate reference torque command values based on a preset reference torque distribution ratio of the front electric motor and the rear electric motor. The control portion gradually restores the torque command values to the reference torque command values after a change amount of the torque command values becomes smaller than a predetermined value.

Although several embodiments of the invention have been discussed, these embodiments are not intended to limit the invention but to facilitate the understanding of the invention. The invention may be modified or improved without deviating from the gist thereof, and includes equivalents thereto. The elements mentioned in the claims and the specification may be arbitrarily combined or omitted as long as at least a part of the above-mentioned problem is solved or at least a part of the above-mentioned advantageous effects is produced.

The present application claims priority to Japanese Patent Application No. 2016-236037 filed on Dec. 5, 2016. The entire disclosure of Japanese Patent Application No. 2016-236037 filed on Dec. 5, 2016, including the specification, the claims, the drawings, and the abstract, is incorporated herein by reference in its entirety.

REFERENCE SIGN LIST

FL, FR: Front wheel
RL, RR: Rear wheel
1$f$: Front motor
1$r$: Rear motor
2$f$, 2$r$: Deceleration mechanism
3$f$, 3$r$: Differential gear
4$f$, 4$r$: Drive shaft
5$f$, 5$r$: Invertor
6: Stroke sensor
7: Accelerator position sensor
8$f$, 8$r$: Resolver
9: Brake controller
10: Wheel speed sensor
11: CAN communication line (communication apparatus)
12: Longitudinal acceleration sensor
CU: Vehicle control unit
BCU: Battery control unit
MCUf, MCUr: Motor control unit

The invention claimed is:

1. A control apparatus for an electric vehicle including a front electric motor which outputs torque to front wheels of a vehicle and a rear electric motor which outputs torque to rear wheels of the vehicle, the control apparatus comprising:
a target torque calculation portion configured to calculate a reference front motor torque command value and a reference rear motor torque command value, which are target torques for the front electric motor and the rear electric motor;

a torque command portion configured to output torque command values to the front electric motor and the rear electric motor; and a control portion configured to control the front electric motor and the rear electric motor so that a difference between the torque command value of the front electric motor and the torque command value of the rear electric motor is larger than a predetermined value while the torque command values changes, wherein the control portion increases the difference as a longitudinal gradient of a road surface increases, and the control portion subjects a low-pass filter processing based on an accelerator pedal position of the vehicle, a brake pedal stroke of the vehicle, the reference front motor torque command value, the reference rear motor torque command value and a longitudinal gradient of a road surface, to thereby makes the difference between the torque command value of the front electric motor and the torque command value of the rear electric motor larger than a predetermined value.

2. The control apparatus for an electric vehicle according to claim 1, wherein the target torque calculation portion calculates reference torque command values based on a preset reference torque distribution ratio of the front electric motor and the rear electric motor, and wherein the control portion gradually restores the torque command values to the reference torque command values after a change amount of the torque command values becomes smaller than a predetermined value.

3. The control apparatus for an electric vehicle according to claim 1, wherein the target torque calculation portion calculates reference torque command values based on a preset reference torque distribution ratio of the front electric motor and the rear electric motor, and wherein the control portion increases the difference by changing the reference torque distribution ratio.

4. The control apparatus for an electric vehicle according to claim 3, wherein the control portion controls the front electric motor and the rear electric motor so that the difference is equal to or smaller than a preset value.

5. The control apparatus for an electric vehicle according to claim 1, wherein the control portion controls the front electric motor and the rear electric motor so that the torque command value of the rear electric motor is smaller than the torque command value of the front electric motor.

6. A control method for an electric vehicle including a front electric motor which outputs torque to front wheels of a vehicle and a rear electric motor which outputs torque to rear wheels of the vehicle, the control method comprising:

calculating a reference front motor torque command value and a reference rear motor torque command value, which are target torques for the front electric motor and the rear electric motor;

outputting torque command values to the front electric motor and the rear electric motor; and controlling the front electric motor and the rear electric motor so that a difference between the torque command value of the front electric motor and the torque command value of the rear electric motor is larger than a predetermined value while the torque command values changes, wherein the controlling the front electric motor and the rear electric motor includes increasing the difference as a longitudinal gradient of a road surface increases the controlling the front electric motor and the rear electric motor subjects a low-pass filter processing based on an accelerator pedal position of the vehicle, a brake pedal stroke of the vehicle, the reference front motor torque command value, the reference rear motor torque command value and a longitudinal gradient of a road surface, to thereby makes the difference between the torque command value of the front electric motor and the torque command value of the rear electric motor larger than a predetermined value.

7. The control method for an electric vehicle according to claim 6, wherein the calculating a reference front motor torque command value and a reference rear motor torque command value calculates reference torque command values based on a preset reference torque distribution ratio of the front electric motor and the rear electric motor, and wherein the controlling the front electric motor and the rear electric motor includes gradually restoring the torque command values to the reference torque command values after a change amount of the torque command values becomes smaller than a predetermined value.

8. The control method for an electric vehicle according to claim 6, wherein the calculating a reference front motor torque command value and a reference rear motor torque command value calculates reference torque command values based on a preset reference torque distribution ratio of the front electric motor and the rear electric motor, and wherein the controlling the front electric motor and the rear electric motor includes increasing the difference by changing the reference torque distribution ratio.

9. The control method for an electric vehicle according to claim 8, wherein the controlling the front electric motor and the rear electric motor includes controlling the front electric motor and the rear electric motor so that the difference is equal to or smaller than a preset predetermined value.

10. The control method for an electric vehicle according to claim 6, wherein the controlling the front electric motor and the rear electric motor includes controlling the front electric motor and the rear electric motor so that the torque command value of the rear electric motor is smaller than the torque command value of the front electric motor.

11. A control system for an electric vehicle, the control system comprising:

a front electric motor configured to output torque to front wheels of a vehicle;

a rear electric motor configured to output torque to rear wheels of the vehicle; and a control unit configured to control the front electric motor and the rear electric motor, wherein the control unit comprises:

a target torque calculation portion configured to calculate a reference front motor torque command value and a reference rear motor torque command value, which are target torques for the front electric motor and the rear electric motor;

a torque command portion configured to output torque command values to the front electric motor and the rear electric motor; and a control portion configured to control the front electric motor and the rear electric motor so that a difference between the torque command value of the front electric motor and the torque command value of the rear electric motor is larger than a predetermined value while the torque command values changes, wherein the control portion increases the difference as a longitudinal gradient of a road surface increases, and the control portion subjects a low-pass filter processing based on an accelerator pedal position of the vehicle, a brake pedal stroke of the vehicle, the reference front motor torque command value, the reference rear motor torque command value and a longitudinal gradient of a road surface, to thereby makes the difference between the torque command value of the front electric motor and the torque command value of the rear electric motor larger than a predetermined value.

12. The control system for an electric vehicle according to claim 11, wherein target torque calculation portion calculates reference torque command values based on a preset reference torque distribution ratio of the front electric motor and the rear electric motor, and wherein the control portion gradually restores the torque command values to the reference torque command values after a change amount of the torque command values becomes smaller than a predetermined value.

* * * * *